US012439210B2

(12) United States Patent
Lee

(10) Patent No.: US 12,439,210 B2
(45) Date of Patent: Oct. 7, 2025

(54) VIBRATION APPARATUS AND APPARATUS INCLUDING THE SAME

(71) Applicant: LG Display Co., Ltd., Seoul (KR)

(72) Inventor: Sungtae Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 200 days.

(21) Appl. No.: 18/241,657

(22) Filed: Sep. 1, 2023

(65) Prior Publication Data

US 2024/0080624 A1 Mar. 7, 2024

(30) Foreign Application Priority Data

Sep. 5, 2022 (KR) ........................ 10-2022-0112334

(51) Int. Cl.

| | |
|---|---|
| ***H04R 1/02*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............ *H04R 9/046* (2013.01); *H04R 1/028* (2013.01); *H04R 9/025* (2013.01); *H04R 9/06* (2013.01); *H04R 2400/11* (2013.01); *H04R 2499/15* (2013.01)

(58) Field of Classification Search

CPC ........ H04R 9/046; H04R 1/028; H04R 9/025; H04R 9/06; H04R 2400/11; H04R 2499/15

USPC .................................................. 381/333, 334

See application file for complete search history.

(56) References Cited

U.S. PATENT DOCUMENTS

| | | | | |
|---|---|---|---|---|
| 2002/0191803 A1* | 12/2002 | Asada | .................... | H04R 7/045 381/396 |
| 2017/0111728 A1* | 4/2017 | Kim | .................... | H04R 1/1075 |
| 2021/0014590 A1* | 1/2021 | Ha | .......................... | H04R 9/06 |

FOREIGN PATENT DOCUMENTS

KR 10-2018-0121296 A 11/2018

* cited by examiner

*Primary Examiner* — Ammar T Hamid

(74) *Attorney, Agent, or Firm* — Birch, Stewart, Kolasch & Birch, LLP

(57) ABSTRACT

A vibration apparatus includes a frame having an accommodating space, a magnet accommodated into the accommodating space and including a first magnet and a second magnet at a periphery of the first magnet, a bobbin accommodated into the accommodating space and including a first bobbin at a periphery of the first magnet and a second bobbin at a periphery of the first bobbin, a coil including a first coil at a periphery of the first bobbin and a second coil at a periphery of the second bobbin, and a protection member including a first protection member connected to the first bobbin and a second protection member connected to the second bobbin. The second protection member is disposed apart from the first protection member.

35 Claims, 14 Drawing Sheets

VIBRATION APPARATUS AND APPARATUS INCLUDING THE SAME

CROSS-REFERENCE TO RELATED APPLICATIONS

This application claims priority to Korean Patent Application No. 10-2022-0112334 filed in the Republic of Korea on Sep. 5, 2022, the entirety of which is hereby expressly incorporated by reference into the present application.

BACKGROUND

Technical Field

The present disclosure relates to a vibration apparatus and an apparatus including the same, and more particularly, to a vibration apparatus and an apparatus including the same, which can output a sound.

Discussion of the Related Art

An apparatus includes a separate speaker or sound apparatus providing a sound. When a speaker is in a display apparatus or an apparatus, the speaker occupies a space, and due to this set up, the design and spatial disposition of the display apparatus or the apparatus can be limited.

However, because a sound output from the speaker of the display apparatus can travel towards a rearward or a downward direction of the display apparatus, sound quality can be degraded due to interference between sounds reflected from a wall and the ground. For this reason, it can be challenging to transfer an accurate sound, and the immersion experience of a viewer can be reduced.

SUMMARY OF THE DISCLOSURE

The inventor has recognized the above-described limitations and other issues associated with the related art. The inventor has performed various experiments so that when watching an image in front of a display panel, a traveling direction of a sound becomes a direction toward a front surface of the apparatus or the display apparatus, and thus, sound quality is enhanced. Through the various experiments, the inventor has invented an apparatus or a display apparatus having a new structure, which can output sound so that a traveling direction of the sound becomes a direction toward a front surface of the apparatus or the display apparatus, thereby enhancing sound quality.

An aspect of the present disclosure is directed to providing a vibration apparatus which can output a sound of a high-pitched sound band and a sound of a middle-low-pitched sound band.

Another aspect of the present disclosure is directed to providing a vibration apparatus which can separate and output a sound of a high-pitched sound band and a sound of a middle-low-pitched sound band.

Another aspect of the present disclosure is directed to providing an apparatus which can enhance a sound characteristic and/or a sound pressure level characteristic of a low-pitched sound band.

Another aspect of the present disclosure is directed to providing a vibration apparatus and an apparatus including the same, which can vibrate a display member to output a sound in a forward direction of the display member.

Another aspect of the present disclosure is directed to providing a vibration apparatus and an apparatus including the same, which can output a sound of a high-pitched sound band and a sound of a middle-low-pitched sound band, based on a vibration of a vibration member.

Another aspect of the present disclosure is directed to providing a vibration apparatus and an apparatus including the same, which can separate and output a sound of a high-pitched sound band and a sound of a middle-low-pitched sound band generated based on a vibration of a vibration member.

Another aspect of the present disclosure is directed to providing a vibration apparatus and an apparatus including the same, which can enhance a sound characteristic and/or a sound pressure level characteristic of a low-pitched sound band generated based on a vibration of a vibration member.

Additional features, advantages, and aspects of the present disclosure are set forth in the present disclosure and will also be apparent from the present disclosure or can be learned by practice of the inventive concepts provided herein. Other features, advantages, and aspects of the present disclosure can be realized and attained by the structure particularly pointed out in the present disclosure, or derivable therefrom, and claims hereof as well as the appended drawings.

To achieve these and other aspects of the inventive concepts, as embodied and broadly described, a vibration apparatus comprises a frame including an accommodating space; a magnet accommodated into the accommodating space, the magnet including a first magnet and a second magnet at a periphery of the first magnet; a bobbin accommodated into the accommodating space, the bobbin including a first bobbin at a periphery of the first magnet and a second bobbin at a periphery of the first bobbin; a coil including a first coil at a periphery of the first bobbin and a second coil at a periphery of the second bobbin; and a protection member including a first protection member connected to the first bobbin and a second protection member connected to the second bobbin, the second protection member is apart from the first protection member.

In another aspect of the present disclosure, an apparatus comprises a vibration member, a vibration apparatus connected to a rear surface of the vibration member, and a supporting member disposed at the rear surface of the vibration member to support the vibration apparatus, the vibration apparatus comprises a frame including an accommodating space; a magnet accommodated into the accommodating space, the magnet including a first magnet and a second magnet at a periphery of the first magnet; a bobbin accommodated into the accommodating space, the bobbin including a first bobbin at a periphery of the first magnet and a second bobbin at a periphery of the first bobbin; a coil including a first coil at a periphery of the first bobbin and a second coil at a periphery of the second bobbin; and a protection member including a first protection member connected to the first bobbin and a second protection member connected to the second bobbin, the second protection member is apart from the first protection member.

Details of other exemplary embodiments will be included in the detailed description of the disclosure and the accompanying drawings.

A vibration apparatus according to an embodiment of the present disclosure can output a sound of a high-pitched sound band and a sound of a middle-low-pitched sound band.

A vibration apparatus according to an embodiment of the present disclosure can separate and output a sound of a high-pitched sound band and a sound of a middle-low-pitched sound band.

A vibration apparatus according to an embodiment of the present disclosure can enhance a sound characteristic and/or a sound pressure level characteristic of a low-pitched sound band.

A vibration apparatus according to an embodiment of the present disclosure can enhance the quality of a sound and a sound pressure level characteristic of a sound, based on a reduction in total harmonic distortion characteristic.

A vibration apparatus and an apparatus including the same according to an embodiment of the present disclosure can output a sound in a forward direction of a vibration member, based on a vibration of the vibration member.

A vibration apparatus and an apparatus including the same according to an embodiment of the present disclosure can output a sound of a high-pitched sound band and a sound of a middle-low-pitched sound band, based on a vibration of a vibration member.

A vibration apparatus and an apparatus including the same according to an embodiment of the present disclosure can separate and output a sound of a high-pitched sound band and a sound of a middle-low-pitched sound band generated based on a vibration of a vibration member.

A vibration apparatus and an apparatus including the same according to an embodiment of the present disclosure can enhance a sound characteristic and/or a sound pressure level characteristic of a low-pitched sound band generated based on a vibration of a vibration member.

A vibration apparatus and an apparatus including the same according to an embodiment of the present disclosure can enhance the quality of a sound and a sound pressure level characteristic of a sound, based on a reduction in total harmonic distortion characteristic caused by a vibration of a vibration member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples and explanatory, and are intended to provide further explanation of the disclosures as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
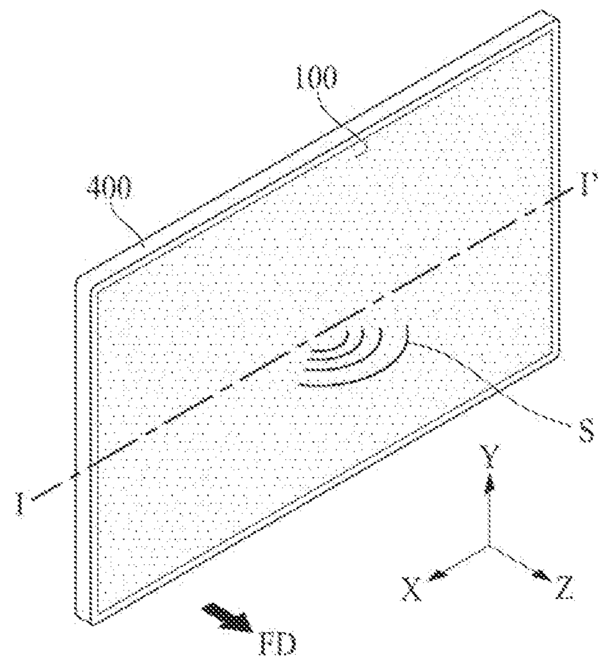
FIG. 1 is a diagram illustrating an apparatus according to an embodiment of the present disclosure.

Throughout the drawings and the detailed description, unless otherwise described, the same drawing reference numerals should be understood to refer to the same elements, features, or structures. The sizes, lengths, and thicknesses of layers, regions and elements, and depiction thereof can be exaggerated for clarity, illustration, or convenience.

DETAILED DESCRIPTION OF THE EMBODIMENTS

Reference is now made in detail to embodiments of the present disclosure, examples of which can be illustrated in the accompanying drawings. In the following description, where a detailed description of relevant known functions or configurations can unnecessarily obscure aspects of the present disclosure, a detailed description of such known functions or configurations can be omitted for brevity. The progression of processing steps and/or operations described is an example, and the sequence of steps and/or operations is not limited to that set forth herein and can be changed, with the exception of steps and/or operations necessarily occurring in a particular order.

Advantages and features of the present disclosure, and implementation methods thereof, are clarified through the following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to understand the inventive concepts fully without limiting the protected scope of the present disclosure.

The shapes, dimensions, areas, ratios, angles, numbers, and the like, which are illustrated in the drawings to describe various example embodiments of the present disclosure, are merely given by way of example. Therefore, the present disclosure is not limited to the illustrations in the drawings. Like reference numerals generally denote like elements throughout the specification, unless otherwise specified.

Where a term like "comprise," "have," "include," "contain," "constitute," "made up of," or "formed of" is used, one or more other elements can be added unless a more limiting term, such as "only" or the like, is used. The terms and names used in the present disclosure are merely used to describe particular embodiments and are not intended to limit the scope of the present disclosure. An element described in the singular form is intended to include a plurality of elements, and vice versa, unless the context clearly indicates otherwise.

The word "exemplary" is used to mean serving as an example or illustration, unless otherwise specified. Embodiments are example embodiments. Aspects are example aspects. Any implementation described herein as an "example" is not necessarily to be construed as preferred or advantageous over other implementations.

In one or more aspects, an element, feature, or corresponding information (e.g., a level, range, dimension, size, or the like) is construed as including an error or tolerance range even where no explicit description of such an error or tolerance range is provided. An error or tolerance range can be caused by various factors (e.g., process factors, internal or external impact, noise, or the like). Further, the term "may" encompasses all the meanings of the term "can."

In describing a positional relationship where the positional relationship between two parts is described, for example, using "on," "over," "under," "above," "below," "beneath," "near," "close to," "adjacent to," "beside," "next to," "on a side of" or the like, one or more other parts can be located between the two parts unless a more limiting term, such as "immediate(ly)," "direct(ly)," or "close(ly)," is used. For example, where a structure is described as being positioned "on," "over," "under," "above," "below," "beneath," "near," "close to," "adjacent to," "beside," "next to" or "on a side of" another structure, this description should be construed as including a case in which the structures contact each other as well as a case in which one or more additional structures are disposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference, unless otherwise specified.

In describing a temporal relationship, where the temporal order is described as, for example, "after," "subsequent," "next," "before," "preceding," "prior to," or the like, a case that is not consecutive or not sequential can be included unless a more limiting term, such as "just," "immediate(ly)," or "direct(ly)," is used.

It will be understood that, although the term "first," "second," or the like can be used herein to describe various elements, these elements should not be limited by these terms, for example, to any particular order, sequence, precedence, or number of elements. These terms are only used to distinguish one element from another. For example, a first element could be termed a second element, and, similarly, a second element could be termed a first element, without departing from the scope of the present disclosure. Furthermore, the first element, the second element, and the like can be arbitrarily named according to the convenience of those skilled in the art without departing from the scope of the present disclosure. The terms "first," "second," and the like can be used to distinguish components from each other, but the functions or structures of the components are not limited by ordinal numbers or component names in front of the components.

In describing elements of the present disclosure, the terms "first," "second," "A," "B," "(a)," "(b)," or the like can be used. These terms are intended to identify the corresponding element(s) from the other element(s), and are not used to define the essence, basis, order, or number of the elements.

Where an element is described as "connected," "coupled," "attached," or "adhered" to another element or layer, the element or layer can not only be directly connected, coupled, attached, or adhered to another element or layer, but also be indirectly connected, coupled, attached, or adhered to another element or layer with one or more intervening elements or layers disposed or interposed between the elements or layers, unless otherwise specified.

For the expression that an element or layer "contacts," "overlaps," or the like with another element or layer, the element or layer can not only directly contact, overlap, or the like with another element or layer, but also indirectly contact, overlap, or the like with another element or layer with one or more intervening elements or layers disposed or interposed between the elements or layers, unless otherwise specified.

Such terms as a "line" or "direction" should not be interpreted only based on a geometrical relationship in which the respective lines or directions are parallel or perpendicular to each other. Such terms can mean a wider range of lines or directions within which the components of the present disclosure can operate functionally.

The term "at least one" should be understood as including any and all combinations of one or more of the associated listed items. For example, the meaning of "at least one of a first item, a second item, and a third item" encompasses the combination of all three listed items, combinations of any two the first item, the second item, and the third item, as well as any individual item, the first item, the second item, or the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any combination of two of A, B, and C; and all of A, B, and C. Furthermore, an expression "element A/element B" can be understood as element A and/or element B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

Features of various embodiments of the present disclosure can be partially or wholly coupled to or combined with each other, and can be operated, linked, or driven together in various ways. Embodiments of the present disclosure can be carried out independently from each other, or can be carried out together in a co-dependent or related relationship. In one or more aspects, the components of each apparatus according to various embodiments of the present disclosure can be operatively coupled and configured.

Unless otherwise defined, the terms (including technical and scientific terms) used herein have the same meaning as commonly understood by one of ordinary skill in the art to which example embodiments belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

In the following description, various example embodiments of the present disclosure are described in detail with reference to the accompanying drawings. With respect to reference numerals to elements of each of the drawings, the same elements can be illustrated in other drawings, and like reference numerals can refer to like elements unless stated otherwise. In addition, for convenience of description, a scale, dimension, size, and thickness of each of the elements illustrated in the accompanying drawings can be different from an actual scale, dimension, size, and thickness. Thus, embodiments of the present disclosure are not limited to a scale, dimension, size, or thickness illustrated in the drawings.

Figure 2:
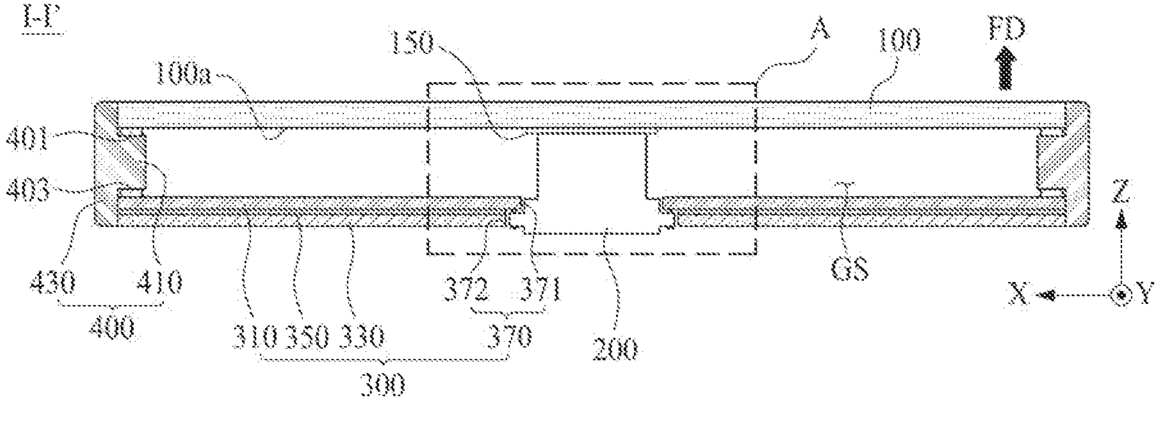
FIG. 2 is a cross-sectional view taken along line I-I' illustrated in FIG. 1.

FIG. 1 is a diagram illustrating an apparatus according to an embodiment of the present disclosure. FIG. 2 is a cross-sectional view taken along line I-I' illustrated in FIG. 1.

With reference to FIGS. 1 and 2, an apparatus according to an embodiment of the present disclosure can be implemented as or in a display apparatus, an image display apparatus, a sound apparatus, a sound output apparatus, a vibration apparatus, a vibration generating apparatus, a sound bar, a sound system, a sound apparatus for electronic apparatuses, a sound apparatus for displays, a sound apparatus for vehicular apparatuses, or a sound bar for vehicular apparatuses, or the like. For example, the vehicular apparatus can include one or more seats and one or more glass windows. For example, the vehicular apparatus can include a vehicle, a train, a ship, or an aircraft, but embodiments of the present disclosure are not limited thereto. Further, the apparatus according to an embodiment of the present disclosure can be implemented as or in or realize an analog signage or a digital signage, or the like such as an advertising signboard, a poster, or a noticeboard, or the like.

The apparatus according to an embodiment of the present disclosure can include a vibration member 100 and one or more vibration apparatus 200 disposed in a rear surface (or a backside surface) 100*a* of the vibration member 100. For example, the vibration member 100 can be a vibration object, a display member, a display panel, a signage panel, a passive vibration member, a vibration plate, a passive vibration plate, a front member, a rear member, a vibration panel, a sound panel, a passive vibration panel, a sound output plate, a sound vibration plate, or an image screen, or the like, but embodiments of the present disclosure are not limited thereto.

The vibration member 100 according to an embodiment of the present disclosure can a display panel configured to display an image. The display panel can be configured to display an image, for example, an electronic image, a digital image, a still image, or a video image, or the like. For example, the display panel can be configured to display an image by outputting light. The display panel can be a curved display panel or one of all types of display panels such as a liquid crystal display panel, an organic light emitting display panel, a quantum dot light emitting display panel, a micro light emitting diode display panel, and an electrophoretic display panel. The display panel can be a flexible display panel. For example, the flexible display panel can be a flexible light emitting display panel, a flexible electrophoretic display panel, a flexible electro-wetting display panel, a flexible light emitting diode display panel, or a flexible quantum dot light emitting display panel, but embodiments of the present disclosure are not limited thereto.

The display panel according to an embodiment of the present disclosure can include a display area which displays an image based on driving of a plurality of pixels. Further, the display panel can include a non-display area which surrounds the display area, but embodiments of the present disclosure are not limited thereto.

The display panel according to an embodiment of the present disclosure can be configured to display an image in a type such as a top emission type, a bottom emission type, a dual emission type, or the like according to a structure of the pixel array layer including an anode electrode, a cathode electrode, and a light emitting device. In the top emission type, an image can be displayed by outputting visible light generated from the pixel array layer to the forward region of a base substrate. In the bottom emission type, an image can be displayed by outputting visible light generated from the pixel array layer to the backward region of the base substrate.

The display panel according to an embodiment of the present disclosure can include a pixel array part disposed in a pixel area configured by a plurality of gate lines and/or a plurality of data lines. The pixel array part can include a plurality of pixels which display an image based on a signal supplied through the signal lines. The signal lines can include a gate line, a data line, a pixel driving power line, or the like, but embodiments of the present disclosure are not limited thereto.

Each of the plurality of pixels can include a pixel circuit layer including a driving thin film transistor (TFT) provided at the pixel area, an anode electrode (or a first electrode) electrically connected to the driving TFT, a light emitting device formed over the anode electrode, and a cathode electrode (or a second electrode) electrically connected to the light emitting device.

The driving TFT can be configured at a transistor region of each pixel area disposed at a substrate. The driving TFT can include a gate electrode, a gate insulation layer, a semiconductor layer, a source electrode, and a drain electrode. The semiconductor layer of the driving TFT can include silicon such as amorphous silicon (a-Si), polysilicon (poly-Si), or low temperature poly-Si or can include oxide such as indium-gallium-zinc-oxide (IGZO), or the like, but embodiments of the present disclosure are not limited thereto.

The anode electrode can be provided at an opening region provided at each pixel area and can be electrically connected to the driving TFT.

The light emitting device according to an embodiment can include a light emitting device layer formed on (or over) the anode electrode. The light emitting device layer can be implemented to emit light having the same color (for example, white light or blue light) for each pixel, or can be implemented to emit light having a different color (for example, red light, green light, or blue light) for each pixel. The cathode electrode (or a common electrode) can be connected to the light emitting device layer provided at each pixel area in common. For example, the light emitting device layer can have a single structure including the same color for each pixel or a stack structure including two or more structures including the same color for each pixel.

The light emitting device according to another embodiment of the present disclosure can include a micro light emitting diode device electrically connected to each of an anode electrode and a cathode electrode. The micro light emitting diode device can be a light emitting diode implemented as an integrated circuit (IC) or chip type. The micro light emitting diode device can include a first terminal electrically connected to the anode electrode and a second terminal electrically connected to the cathode electrode. The cathode electrode can be connected to the second terminal of the micro light emitting diode device provided at each pixel area in common.

An encapsulation part can be formed on (or over) the substrate to surround the pixel array part, thereby preventing oxygen or water from penetrating into the light emitting device of the pixel array part. The encapsulation part according to an embodiment of the present disclosure can be formed in a multi-layer structure where an organic material layer and an inorganic material layer are alternately stacked, but embodiment of the present disclosure is not limited thereto. The inorganic material layer can prevent oxygen or water from penetrating into the light emitting device of the pixel array part. The organic material layer can be formed to have a thickness which is relatively thicker than the inorganic material layer so as to cover particles occurring in a manufacturing process, but embodiment of the present disclosure is not limited thereto. The touch panel can be disposed on (or over) the encapsulation part, or can be disposed at a rear surface of the pixel array part.

The display panel according to an embodiment of the present disclosure can include a first substrate, a second substrate, and a liquid crystal layer. The first substrate can be an upper substrate or a thin film transistor (TFT) array substrate. For example, the first substrate can include a pixel array part (or a display part or a display area) including a plurality of pixels which are respectively formed at a plurality of pixel areas defined by intersections between a plurality of gate lines and/or a plurality of data lines. Each of the plurality of pixels can include a TFT connected to a gate line and/or a data line, a pixel electrode connected to the TFT, and a common electrode which is formed adjacent to the pixel electrode and is supplied with a common voltage.

The first substrate can further include a pad part provided at a first periphery (or a first non-display part) and a gate driving circuit provided at a second periphery (or a second non-display part).

The pad part can supply a signal, supplied from the outside, to the pixel array part and/or the gate driving circuit. For example, the pad part can include a plurality of data pads connected to a plurality of data lines through a plurality of data link lines and/or a plurality of gate input pads connected to the gate driving circuit through a gate control signal line. For example, the first substrate can have a size which is greater than the second substrate, but embodiments of the present disclosure are not limited thereto.

The gate driving circuit can be embedded (or integrated) into a second periphery of the first substrate so as to be connected to the plurality of gate lines. For example, the gate driving circuit can be implemented as a shift register including a transistor, which is formed through the same process as the TFT provided at the pixel area. The gate driving circuit according to another embodiment of the present disclosure may not be embedded into the first substrate and can be configured in the form of an integrated circuit (IC) type and can be included a panel driving circuit.

The second substrate can be a lower substrate or a color filter array substrate. For example, the second substrate can include a pixel opening pattern (or a black matrix) including an opening area overlapping with the pixel area formed in the first substrate, and a color filter layer formed at the opening area. The second substrate can have a size which is smaller than the first substrate, but embodiments of the present disclosure are not limited thereto. For example, the second substrate can overlap a remaining portion, other than the first periphery, of the first substrate. The second substrate can be attached to a remaining portion, other than the first periphery, of the first substrate with a liquid crystal layer therebetween using a sealant.

The liquid crystal layer can be disposed between the first substrate and the second substrate. The liquid crystal layer can include a liquid crystal including liquid crystal molecules where an alignment direction thereof is changed based on an electric field generated by the common voltage and a data voltage applied to a pixel electrode for each pixel.

A first polarization member can be disposed at an upper surface of the first substrate and can polarize light which passes through the first substrate and is output to the outside. A second polarization member can be disposed at a lower surface of the second substrate and can polarize light which is incident from the backlight and travels to the liquid crystal layer.

The display panel according to an embodiment of the present disclosure can drive the liquid crystal layer based on an electric field which is generated in each pixel by the data voltage and the common voltage applied to each pixel, and thus, can display an image based on light passing through the liquid crystal layer.

In display panel according to another embodiment of the present disclosure, the first substrate can be implemented as the color filter array substrate, and the second substrate can be implemented as the TFT array substrate. For example, the display panel according to another embodiment of the present disclosure can have a type where an upper portion and a lower portion of the display panel according to an embodiment of the present disclosure are reversed therebetween. For example, a pad part of the display panel according to another embodiment of the present disclosure can be covered by a separate mechanism.

The display panel according to another embodiment of the present disclosure can include a bending portion which is bent or curved to have a curved shape or a certain curvature radius.

The bending portion of the display panel can be implemented in at least one or more of one periphery and the other periphery of the display panel, which are parallel to each other. The one periphery and/or the other periphery, where the bending portion is implemented, of the display panel 100 can include only the non-display area, or can include the non-display area and a periphery of the display area. The display panel including the bending portion implemented by bending of the non-display area can have a one-side bezel bending structure or a both-side bezel bending structure. Moreover, the display panel including the bending portion implemented by bending of the non-display area and the periphery of the display area can have a one-side active bending structure or a both-side active bending structure.

The vibration member 100 according to another embodiment of the present disclosure can be configured to be transparent, translucent, or opaque. The vibration member 100 can include a metal material or a nonmetal material (or a composite nonmetal material) having a material characteristic suitable for outputting a sound based on a vibration.

According to an embodiment of the present disclosure, the metal material of the vibration member 100 can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. For example, the vibration member 100 can be configured as a metal material such as aluminum (Al) or a plastic material such as plastic or styrene material, but embodiments of the present disclosure are not limited thereto. For example, the styrene material can be an ABS material. The ABS material can be acrylonitrile, butadiene, and styrene.

According to an embodiment of the present disclosure, the nonmetal material (or the composite nonmetal material) of the vibration member 100 can include one or more material (or substance) of plastic, fiber, leather, wood, cloth, rubber, carbon, glass, and paper, but embodiments of the present disclosure are not limited thereto. For example, the paper can be a cone paper for speakers. For example, the cone paper can be pulp or foamed plastic, or the like, but embodiments of the present disclosure are not limited thereto.

According to an embodiment of the present disclosure, the vibration member 100 can include a plastic material including a porous pattern. The porous pattern can be a bubble, a micro bubble, or a foam, but embodiments of the present disclosure are not limited thereto. The vibration member 100 can be configured as a micro foamable and rollable plastic material. For example, the vibration member 100 can include a porous plastic material or a micro cellular plastic material. For example, the vibration member 100 can be configured as a polyethylene terephthalate (PET) material or a polycarbonate (PC) material. For example, the vibration member 100 can be configured as a Micro Cellular polyethylene terephthalate (MCPET) material.

The vibration member 100 according to another embodiment of the present disclosure can include a non-display panel. For example, the vibration member 100 can include one or more of a screen panel on which an image is to be projected from a display apparatus, a lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror, but embodiments of the present disclosure are not limited thereto. For example, the lighting panel can be a light emitting diode lighting panel (or apparatus), an organic light emitting lighting panel (or apparatus), or an inorganic light emitting lighting panel (or apparatus), but embodiments of the present disclosure are not limited thereto.

The vibration apparatus 200 can be configured to vibrate the vibration member 100. For example, vibration apparatus 200 can be configured to directly vibrate the vibration member 100. For example, the vibration apparatus 200 can be implemented at the rear surface 100*a* of the vibration member 100. For example, the vibration apparatus 200 can vibrate the vibration member 100 at the rear surface 100*a* of the vibration member 100, thereby providing a sound and/or a haptic feedback based on the vibration of the vibration member 100 to a user. For example, when the vibration member 100 is a display panel, vibration apparatus 200 can be configured at the rear surface 100*a* of the display panel so as to overlap with a display area of the display panel, thereby providing a sound and/or a haptic feedback based on the vibration of the of the display panel to a user. For example, the vibration apparatus 200 can use the vibration member 100 as a vibration plate to output sound S. For example, the vibration apparatus 200 can use the vibration member 100 as a vibration plate (or a sound plate) to output sound S in a front direction (or a forward direction) FD of the vibration member 100. For example, the vibration apparatus 200 can generate a sound S so that a traveling direction of the sound is the front direction (or the forward direction) FD of the display panel or the vibration member 100. The vibration apparatus 200 can vibrate the vibration member 100 to output sound S. For example, the vibration apparatus 200 can directly vibrate the vibration member 100 to output the sound S in the front direction (or the forward direction) FD of the apparatus. For example, the vibration apparatus 200 can directly vibrate the vibration member 100 to output the sound S of a high-pitched sound band and a sound of a middle-low-pitched sound band in the front direction (or the forward direction) FD of the apparatus.

According to an embodiment of the present disclosure, the vibration apparatus 200 can vibrate according to a voice signal synchronized with an image displayed on the display panel that is the vibration member 100 to vibrate the display panel. According to another embodiment of the present disclosure, the vibration apparatus 200 can vibrate according to a haptic feedback signal (or a tactile feedback signal) synchronized with a user touch applied to a touch panel (or a touch sensor layer) which is disposed on (or over) the display panel or embedded into the display panel and can vibrate the display panel. Accordingly, the display panel can vibrate based on a vibration of the vibration apparatus 200 to provide a user (or a viewer) with at least one or more of a sound S and a haptic feedback.

The vibration apparatus 200 according to an embodiment of the present disclosure can be a vibrator, a vibration generator, a vibration generating apparatus, a vibration generating device, a sound generator, a sound generating apparatus, a sound generating device, a coil speaker, a transducer, an actuator, or an exciter, but embodiments of the present disclosure are not limited thereto.

The supporting member 300 can be disposed at the rear surface 100*a* of the vibration member 100. For example, the supporting member 300 can cover the rear surface 100*a* of the vibration member 100 and can be configured to support (or fix) the vibration apparatus 200. For example, the supporting member 300 can be configured to surround lateral surfaces and the rear surface 100*a* of the vibration member 100.

The supporting member 300 can cover an entire rear surface 100*a* of the vibration member 100 with a gap space GS therebetween. The supporting member 300 can be spaced apart from a rearmost surface of the vibration member 100 with the gap space GS therebetween. For example, the gap space GS can be referred to as an internal space, an air gap, a vibration space, or a sound sounding box, but embodiments of the present disclosure are not limited thereto.

The supporting member 300 according to an embodiment of the present disclosure can include one or more materials of a glass material, a metal material, and a plastic material. For example, the supporting member 300 can be a rear structure, a set structure, a supporting structure, a supporting cover, a back cover, a cover bottom, a rear member, a case, or a housing, but embodiments of the present disclosure are not limited thereto. For example, the supporting member 300 can be implemented as an arbitrary type frame or a plate structure each disposed at the rear surface 100*a* of the vibration member 100.

The supporting member 300 according to an embodiment of the present disclosure can include a first supporting member 310 and a second supporting member 330.

The first supporting member 310 can be disposed between the second supporting member 330 and the vibration member 100. For example, the first supporting member 310 can be disposed between a rear periphery portion of the vibration member 100 and a front periphery portion of the second supporting member 330. The first supporting member 310 can support one or more of the rear periphery portion of the vibration member 100 and the front periphery portion of the second supporting member 330. As another embodiment of the present disclosure, the first supporting member 310 can be configured to cover a portion of the rear surface of the vibration member 100. For example, the first supporting member 310 can be configured to cover the entire rear surface 100*a* of the vibration member 100. For example, the first supporting member 310 can include one or more materials of a glass material, a metal material, and a plastic material. For example, the first supporting member 310 can be an inner plate, a first rear structure, a first supporting structure, a first supporting cover, a first back cover, a first rear member, an internal plate, or an internal cover, but embodiments of the present disclosure are not limited thereto.

The first supporting member 310 can be spaced apart from a rearmost surface of the vibration member 100 with the gap space GS therebetween, and can be disposed (or configured) to support (or fix) the vibration apparatus 200.

The second supporting member 330 can be disposed at a rear surface of the first supporting member 310. For example, the second supporting member 330 can be a member which covers the entire rear surface 100*a* of the vibration member 100. For example, the first supporting member 310 can be disposed at a region between the rear surface 100*a* of the vibration member 100 and a front surface of the second supporting member 330. For example, the second supporting member 330 can include one or more materials of a glass material, a metal material, and a plastic material. For example, the second supporting member 330 can be an outer plate, a rear plate, a back plate, a back cover, a rear cover, a second rear structure, a second supporting structure, a second supporting cover, a second back cover, a second rear member, an external plate, or an external cover, but embodiments of the present disclosure are not limited thereto.

According to an embodiment of the present disclosure, the first supporting member 310 and the second supporting member 330 can include different materials. For example, the first supporting member 310 can include a metal material such as an Al material which is good in heat conductivity, and the second supporting member 330 can include a glass material, but embodiments of the present disclosure are not limited thereto.

According to an embodiment of the present disclosure, the first supporting member 310 and the second supporting member 330 can have the same thickness or different thicknesses. For example, the first supporting member 310 can have a thickness which is relatively thinner than the second supporting member 330, but embodiments of the present disclosure are not limited thereto.

The supporting member 300 according to an embodiment of the present disclosure can further include a connection member (or a coupling member) 350.

The connection member 350 can be disposed at a region between the first supporting member 310 and the second supporting member 330. For example, the first supporting member 310 and the second supporting member 330 can be coupled to or connected to each other by the connection member 350. For example, the connection member 350 can be an adhesive resin, a double-sided tape, or a double-sided adhesive foam pad, but embodiments of the present disclosure are not limited thereto. For example, the connection member 350 can have elasticity for absorbing an impact, but embodiments of the present disclosure are not limited thereto. For example, the connection member 350 can be disposed at an entire region between the first supporting member 310 and the second supporting member 350. As another embodiment of the present disclosure, the connection member 350 can be formed in a mesh structure having an air gap between the first supporting member 310 and the second supporting member 330.

The apparatus or the supporting member 300 according to an embodiment of the present disclosure can further include a through portion (or a through hole) 370.

The through portion 370 can be configured to vertically pass through the supporting member 300 along a thickness direction Z of the supporting member 300. Therefore, the vibration apparatus 200 can be inserted into the through portion 370 of the supporting member 300 and can be fixed to (or supported by) the supporting member 300. An upper portion (or an upper side) of the vibration apparatus 200 can pass through the through portion 370 of the supporting member 300 and can be connected (or coupled) to the rear surface 100*a* of the vibration member 100. A lower portion (or a lower side) of the vibration apparatus 200 can be fixed to (or supported by) the through portion 370 of the supporting member 300.

The through portion 370 of the supporting member 300 according to an embodiment of the present disclosure can include a first through hole 371 and a second through hole 372.

The first through hole (or a first hole) 371 can be configured at the first supporting member 310 of the supporting member 300. The first through hole 371 can be configured to vertically pass through the first supporting member 310 of the supporting member 300 along a thickness direction Z of the supporting member 300. The first through hole 371 can be configured to have a size which enables an upper portion of the vibration apparatus 200 to be inserted thereinto. For example, the first through hole 371 can have a size which is greater than the upper portion of the vibration apparatus 200 and smaller than the lower portion of the vibration apparatus 200.

The second through hole (or a second hole) 372 can be configured at the second supporting member 330 of the supporting member 300. The second through hole 372 can be configured to vertically pass through the second supporting member 330 of the supporting member 300 along the thickness direction Z of the supporting member 300 and can be configured to be connected to (or communicate with) the first through hole 371. The second through hole 372 can be configured to have a size which enables all of the vibration apparatus 200 to be inserted thereinto. For example, the second through hole 372 can have a size which is greater than the upper portion of the vibration apparatus 200 and smaller than the lower portion of the vibration apparatus 200. Accordingly, the second through hole 372 can accommodate (or receive) the lower portion of the vibration apparatus 200, and thus, a thickness of an apparatus can be reduced.

The first through hole 371 can have a size which is smaller than that of the second through hole 372, and thus, a portion of the first supporting member 310 at a periphery of the first through hole 371 can be exposed at a rear surface of the supporting member 300 through the second through hole 372. For example, a portion of the first supporting member 310 at a periphery of the first through hole 371 exposed at the rear surface of the supporting member 300 by the second through hole 372 can be a coupling portion with the vibration apparatus 200.

The apparatus according to an embodiment of the present disclosure can further include a middle frame 400.

The middle frame 400 can be disposed at a region between the rear periphery of vibration member 100 and the front periphery of the supporting member 300. The middle frame 400 can support one or more of the rear periphery of the vibration member 100 and the front periphery of the supporting member 300. The middle frame 400 can surround one or more of lateral surfaces of each of the vibration member 100 and the supporting member 300. The middle frame 400 can provide a gap space GS between the vibration member 100 and the supporting member 300. The middle frame 400 can be referred to as a middle cabinet, a middle cover, a middle chassis, a connection member, a frame, a frame member, or a side cover member, or the like, but embodiments of the present disclosure are not limited thereto.

The middle frame 400 according to an embodiment of the present disclosure can include a first supporting part 410 and a second supporting part 430. For example, the second supporting part 430 can be a sidewall part, but embodiments of the present disclosure are not limited thereto.

The first supporting part 410 can be disposed at a region between the rear periphery of the vibration member 100 and the front periphery of the supporting member 300, and thus, can provide a gap space GS between the vibration member 100 and the supporting member 300. A front surface of the first supporting part 410 can be coupled or connected to the rear periphery of the vibration member 100 by a first connection member 401. A rear surface of the first supporting part 410 can be coupled or connected to the front periphery of the supporting member 300 by a second connection member 403. For example, the first supporting part 410 can have a single picture frame structure having a tetragonal shape or a frame structure having a plurality of divided bar shapes, but embodiments of the present disclosure are not limited thereto.

The second supporting part 430 can be disposed in parallel with the thickness direction Z of the apparatus or the vibration member 100. For example, the second supporting part 430 can be vertically coupled to an outer surface of the first supporting part 410 in parallel with the thickness direction Z of the vibration member 100. The second supporting part 430 can surround one or more of an outer surface of the vibration member 100 and an outer surface of the supporting member 300, thereby protecting the outer surface of one or more of the vibration member 100 and the supporting member 300. The first supporting part 410 can protrude from an inner surface of the second supporting part 430 toward the vibration apparatus 200 at a region between the vibration member 100 and the support member 300.

The apparatus according to an embodiment of the present disclosure can include a panel connection member (or connection member) instead of the middle frame 400. The panel connection member can be a connection member, a partition, a gap member, a pad, or a gap pad.

The panel connection member can be disposed at a region between the rear periphery of the vibration member 100 and the front periphery of the supporting member 300 and can provide the gap space GS between the vibration member 100 and the supporting member 300. The panel connection member can be disposed at a region between the rear periphery of the vibration member 100 and the front periphery of the supporting member 300 to adhere each of the vibration member 100 and the support member 300. For example, the panel connection member can be configured as a double-sided tape, a single-sided tape, or a double-sided adhesive foam pad, but embodiments of the present disclosure are not limited thereto. For example, an adhesive layer of the panel connection member can include epoxy-based, acrylic-based, silicone-based, or urethane-based adhesive material, but embodiments of the present disclosure are not limited thereto. For example, in order to minimize the vibration of the vibration member 100 from being transmitted to the support member 300, an adhesive layer of the panel connection member can include a urethane-based material which relatively has a ductile characteristic compared to acrylic-based of acrylic-based and urethane-based. Accordingly, a vibration of the vibration member 100 transmitted to the support member 300 can be minimized.

In the apparatus according to an embodiment of the present disclosure, when the apparatus includes a panel connection member instead of a middle frame 400, the supporting member 300 can include a bending sidewall which is bent from one side (or an end portion) of the second supporting member 330 (or the first supporting member 310) and surrounds an outer surface (or an outer sidewall) of the vibration member 100. The bending sidewall according to an embodiment of the present disclosure can have a single sidewall structure or a hemming structure. The hemming structure can be a structure where end portions of an arbitrary member are bent in a curve shape and stacked with each other or are spaced apart from each other in parallel. For example, in order to enhance a sense of beauty in design, the bending sidewall can include a first bending sidewall, bent from one side (or an end portion) of the second supporting member 330, and a second bending sidewall bent from the first bending sidewall to a region between the first bending sidewall and an outer surface of the vibration member 100. The second bending sidewall can be spaced apart from an inner surface of the first bending sidewall to prevent (or minimize) contact with the inner surface of the first bending sidewall or external impact in a lateral direction from being transmitted to the outer surface of the display panel 100. Therefore, the second bending sidewall can minimize (or prevent) the outer surface of the vibration member 100 from contacting an inner surface of the first bending sidewall or can minimize (or prevent) a lateral-direction external impact from being transferred to the outer surface of the vibration member 100.

The apparatus according to an embodiment of the present disclosure can further include a heat dissipation member 150.

The heat dissipation member 150 can be configured to decrease or reduce heat occurring in the vibration apparatus 200. For example, the heat dissipation member 150 can be disposed at a region between the rear surface 100*a* of the vibration member 100 and the vibration apparatus 200. For example, the heat dissipation member 150 can prevent or minimize the transfer of heat, occurring in the vibration apparatus 200, to the vibration member 100. For example, the heat dissipation member 150 can diffuse heat, occurring in the vibration apparatus 200, to a wide region, and thus, can limit the local temperature increase of the vibration member 100 caused by heat occurring in the vibration apparatus 200. For example, the heat dissipation member 150 can prevent or minimize the transfer of heat, occurring in the vibration apparatus 200, to the display panel which is the vibration member 100. For example, the heat dissipation member 150 can limit the temperature rising of the display panel caused by heat which occurs due to an operation of the vibration apparatus 200 when the display panel outputs a sound, and thus, can prevent an image quality defect of the display panel from occurring due to a rapid temperature difference in a local region of the display panel overlapping the vibration apparatus 200. For example, the heat dissipation member 150 can diffuse heat, occurring in the vibration apparatus 200, to a wide region, and thus, can prevent the image quality defect of the display panel caused by a rapid temperature difference in a local region of the display panel overlapping the vibration apparatus 200.

According to an embodiment of the present disclosure, the heat dissipation member 150 can be disposed at the rear surface 100*a* of the vibration member 100 by an adhesive member. The heat dissipation member 150 can be configured to cover the vibration apparatus 200 or to have a size which is greater than that of the vibration apparatus 200. For example, the heat dissipation member 150 can have a polygonal plate shape or a circular plate shape having a certain thickness, but embodiments of the present disclosure are not limited thereto. For example, the heat dissipation member 150 can be a heat dissipation sheet or a heat dissipation tape including a metal material, having high heat conductivity, such as aluminum (Al), copper (Cu), or silver (Ag) or an alloy thereof, but embodiments of the present disclosure are not limited thereto. Accordingly, because the apparatus according to an embodiment of the present disclosure further includes the heat dissipation member 150, an adverse effect of heat occurring when the vibration apparatus 200 is vibrating can be reduced on the display panel or the vibration member 100 or the image quality of the display panel.

The apparatus according to an embodiment of the present disclosure can vibrate the vibration member 100, based on a vibration of the vibration apparatus 200, and thus, can output a sound S, generated based on a vibration of the vibration member 100, in the forward direction FD of the vibration member 100. The apparatus according to an embodiment of the present disclosure can vibrate the display panel, based on a vibration of the vibration apparatus 200, and thus, can output a sound S of each of a high-pitched sound band and a middle-low-pitched sound band in the forward (or a front) direction FD of the apparatus, based on a vibration of the display panel. The apparatus according to an embodiment of the present disclosure can output a sound S, synchronized with an image, in the forward direction FD based on a vibration of the display panel while displaying the image on the display panel, thereby enhancing the immersion of a viewer who is watching the image.

Figure 3:
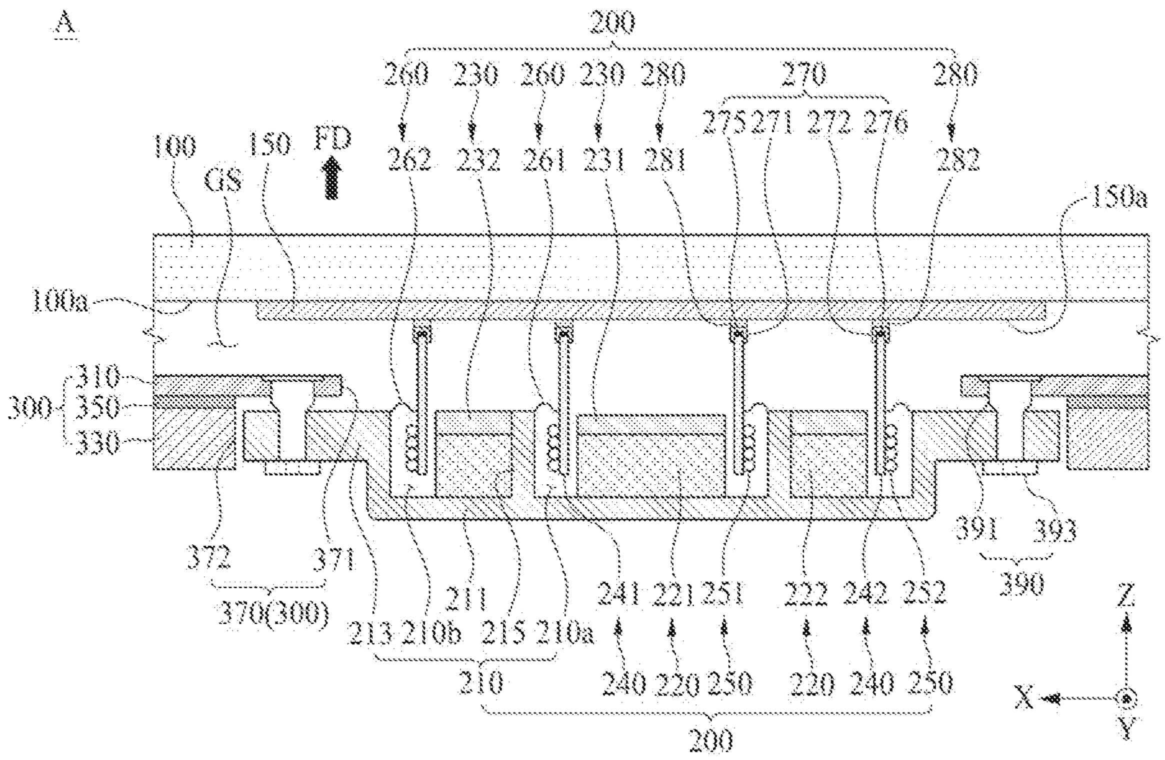
FIG. 3 is an enlarged view of a region 'A' illustrated in FIG. 2.
Figure 4:
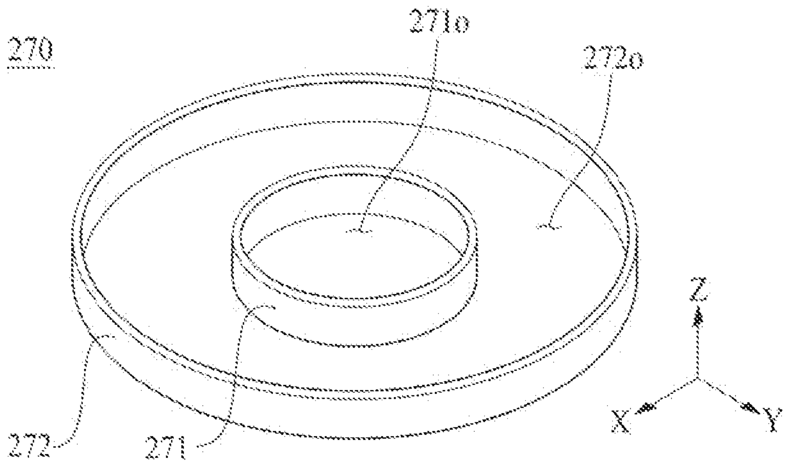
FIG. 4 is a diagram illustrating a protection member according to an embodiment of the present disclosure illustrated in FIGS. 2 and 3.

FIG. 3 is an enlarged view of a region 'A' illustrated in FIG. 2 and illustrates a vibration apparatus according to an embodiment of the present disclosure. FIG. 4 is a diagram illustrating a protection member according to an embodiment of the present disclosure illustrated in FIGS. 2 and 3.

With reference to FIGS. 1 to 4, the vibration apparatus 200 according to an embodiment of the present disclosure can include a frame 210, a magnet 220, a bobbin 240, and a coil 250.

The frame 210 can be configured to be fixed to the supporting member 300. The frame 210 can be fixed to (or supported by) the through portion 370 of the supporting member 300. For example, the frame 210 can be configured to have a size which is greater than that of the first through hole 371 of the supporting member 300 and smaller than that of the second through hole 372 of the supporting member 300, but embodiments of the present disclosure are not limited thereto.

The frame 210 can be configured to be fixed to the supporting member 300 by a fixing member 390. For example, the frame 210 can be coupled (or fixed) to the first supporting member 310 of the supporting member 300 by the fixing member 390. For example, the frame 210 can be coupled (or fixed) to a portion of the first supporting member 310 which is exposed by the second through hole 372 of the supporting member 300 by the fixing member 390.

The fixing member 390 can include a nut 391 and a screw 393. The nut 391 can be coupled (or fixed) to a portion of the first supporting member 310 which is exposed by the second through hole 372 of the supporting member 300. The screw 393 can be fastened to the nut 391 coupled (or fixed) to the first supporting member 310 through the frame 210, and thus, can couple the frame 210 to the first supporting member 310. Accordingly, the frame 210 can be inserted (or accommodated) into the second through hole 372 of the supporting member 300. For example, the nut 391 can be a self-clinching nut. For example, the self-clinching nut can be a PEM® nut, but embodiments of the present disclosure are not limited thereto.

The frame 210 can include a material having thermal conductivity. For example, the frame 210 can be configured as a metal material. For example, the frame 210 can be configured as a metal material such as iron (Fe), but embodiments of the present disclosure are not limited thereto. The frame 210 can be a yoke or the like, but embodiments of the present disclosure are not limited thereto.

The frame 210 can be configured to support or accommodate (or receive) the magnet 220. For example, the frame 210 can be configured to include an accommodating space (or an internal space) 210*a* and 210*b* having a certain depth. The accommodating space 210*a* and 210*b* of the frame 210 can be a space into which the magnet 220 is accommodated and a portion of each of the bobbin 240 and the coil 250 is inserted.

The frame 210 according to an embodiment of the present disclosure can include a first frame portion 211 and a second frame portion 213.

The first frame portion 211 can be configured to support or accommodate (or receive) the magnet 220. For example, the first frame portion 211 can be configured to include the accommodating space (or the internal space) 210*a* and 210*b* having a certain depth. For example, the first frame portion 211 can include a bottom portion (or a bottom frame) and a sidewall portion (or a sidewall frame) connected to a periphery portion (or an edge portion) of the bottom portion. For example, the sidewall portion can be bent from the periphery portion of the bottom portion and can define the accommodating space 210*a* and 210*b* on (or over) the bottom portion. For example, the first frame portion 211 can be configured to include a cross-sectional surface having a 'U'-shape, but embodiments of the present disclosure are not limited thereto. For example, the first frame portion 211 can have a size which is smaller than that of the first through hole 371 of the supporting member 300. For example, the first frame portion 211 can be configured to have a circular shape, an oval shape, or a tetragonal shape. For example, the first frame portion 211 can include a cylinder shape having a circular shape, an oval shape, or a tetragonal shape.

The second frame portion 213 can be configured at at least one lateral surface (or one sidewall) of the first frame portion 211. The second frame portion 213 can be inserted (or accommodated) into the second through hole 372 of the supporting member 300. A size of the second frame portion 213 can have a size which is smaller than that of the second through hole 372 of the supporting member 300 and greater than that of the first through hole 371 of the supporting member 300.

According to an embodiment of the present disclosure, the second frame portion 213 can protrude or extend from an entire lateral surface of the first frame portion 211 to surround the first frame portion 211. For example, the second frame portion 213 can be connected (or integrated) to an upper lateral surface of the first frame portion 211 to have a shape which is the same as or different from that of the first frame portion 211. For example, the second frame portion 213 can have a ring shape or a band shape which is connected (or integrated) to the upper lateral surface of the first frame portion 211.

According to another embodiment of the present disclosure, the second frame portion 213 can include two or more protrusion portions (or extension portions) which protrude or extend from the one lateral surface (or one sidewall) of the first frame portion 211 to surround the first frame portion 211. The two or more protrusion portions can have a symmetric structure with respect to a center portion of the frame 210.

The second frame portion 213 can be fixed to (or supported by) the first supporting member 310 of the supporting member 300. For example, the second frame portion 213 can be fixed to (or supported by) the first supporting member 310 of the supporting member 300 by the fixing member 390. For example, the second frame portion 213 can be inserted (or accommodated) into the second through hole 372 of the supporting member 300 and can be coupled (or fixed) to a portion of the first supporting member 310 exposed through the second through hole 372 by the fixing member 390.

A nut 391 of the fixing member 390 can be inserted (or accommodated) into and fixed to the first supporting member 310 of the supporting member 300 and can be inserted (or accommodated) into the second frame portion 213 of the frame 210. For example, the nut 391 can be a self-clinching nut. For example, the self-clinching nut can be a PEM® nut, but embodiments of the present disclosure are not limited thereto.

A screw (or a bolt) 393 of the fixing member 390 can be fastened to the nut 391, and thus, the screw 393 can couple (or fix) the second frame portion 213 to the first supporting member 310 of the supporting member 300. A head of the screw 393 can have a size which is greater than that of the nut 391 and can contact a rear surface of the second frame portion 213.

The vibration apparatus 200 or the frame 210 according to an embodiment of the present disclosure can further include a partition wall portion 215.

The partition wall portion (or a partition wall) 215 can be configured at the first frame portion 211 of the frame 210. The partition wall portion 215 can be configured so that a plurality of accommodating spaces 210*a* and 210*b* are provided at the first frame portion 211. For example, the partition wall portion 215 can be vertically configured (or configured perpendicular) at a bottom portion of the first frame portion 211. The partition wall portion 215 can be vertically connected to a bottom portion of each of accommodating spaces 210*a* and 210*b* of the first frame portion 211, or can protrude to have a certain height from the bottom portion of the first frame portion 211. Therefore, the partition wall portion 215 can provide the plurality of accommodating spaces 210*a* and 210*b* at the first frame portion 211.

The partition wall portion 215 according to an embodiment of the present disclosure can be configured to divide the accommodating spaces 210*a* and 210*b* of the first frame portion 211 into a first accommodating space 210*a* and a second accommodating space 210*b*. In the accommodating spaces 210*a* and 210*b*, the first accommodating space 210*a* and the second accommodating space 210*b* can be spatially separated from each other by the partition wall portion 215. The first accommodating space 210*a* can be surrounded by the second accommodating space 210*b*. For example, the first accommodating space 210*a* can be an internal space, an inner space, a first division space, a first separation space, or a first vibration space. For example, the second accommodating space 210*b* can be an external space, an outer space, a second division space, a second separation space, or a second vibration space.

In the accommodating spaces 210*a* and 210*b*, the first accommodating space 210*a* and the second accommodating space 210*b* can have the same size or different sizes (or areas). For example, a size (or an area) of the second accommodating space 210*b* can be greater than that of the first accommodating space 210*a*, but embodiments of the present disclosure are not limited thereto.

The partition wall portion 215 can include a ring structure or a band structure having a circular shape, an oval shape, or a tetragonal shape. Accordingly, the first accommodating space 210*a* can one-dimensionally include a circular shape, an oval shape, or a tetragonal shape. For example, the first accommodating space 210*a* can have a circular shape, an oval shape, or a tetragonal shape in plan view. The second accommodating space 210*b* can one-dimensionally include a ring structure or a band structure having a circular shape, an oval shape, or a tetragonal shape. For example, the second accommodating space 210*b* can have a ring structure or a band structure in plan view.

The magnet 220 can be disposed at the frame 210. For example, the magnet 220 can be disposed at the first frame 211 of the frame 210. The magnet 220 can be surrounded by the first frame portion 211. For example, the magnet 220 can be disposed in or accommodated into the accommodating spaces 210*a* and 210*b* of the first frame portion 211. For example, the magnet 220 can have a pillar type having a circular shape, an oval shape, or a tetragonal shape.

The magnet 220 according to an embodiment of the present disclosure can include a plurality of magnets 221 and 222. For example, the magnet 220 can include a first magnet 221 and a second magnet 222.

The first magnet 221 can be disposed in (or accommodated into) the first accommodating space 210*a* configured at the first frame portion 211 of the frame 210. A center portion of the first magnet 221 can be disposed (or located) at a center portion of the first accommodating space 210*a*. for example, a lateral surface (or an outer surface) of the first magnet 221 can be spaced apart from an inner surface (or an internal surface) of the partition wall portion 215. For example, the first magnet 221 can have a pillar type having a circular shape, an oval shape, or a tetragonal shape. The first magnet 221 can be an internal magnet or an inner magnet.

The second magnet 222 can be disposed in (or accommodated into) the second accommodating space 210*b* configured at the first frame portion 211 of the frame 210. One lateral surface (or an inner surface) of the second magnet 222 can contact an outer surface (or an external surface) of the partition wall portion 215. For example, the second magnet 222 can include a ring structure or a band structure having a circular shape, an oval shape, or a tetragonal shape. The second magnet 222 can be an external magnet or an outer magnet.

Each of the magnet 220, the first magnet 221, and the second magnet 222 can be implemented with a sintered magnet such as barium ferrite or the like, and can include $Fe_2O_3$ magnet, $BaCO_3$ magnet, a neodymium magnet, strontium ferrite ($Fe_{12}O_{19}Sr$) magnet with improved magnet component, or an alloy cast magnet including Al, nickel (Ni), and cobalt (Co), or the like, but embodiments of the present disclosure are not limited thereto. For example, the neodymium magnet can be neodymium-iron-boron (Nd—Fe—B).

The bobbin 240 can be disposed (or configured) to surround around the magnet 220. For example, the bobbin 240 can be disposed (or configured) at the accommodating spaces 210*a* and 210*b* of the frame 210 to surround around the magnet 220. For example, a lower portion of the bobbin 240 can be disposed (or configured) at the accommodating spaces 210*a* and 210*b* of the frame 210 to surround around the magnet 220.

The bobbin 240 can be coupled (or connected) to the rear surface 100*a* of the vibration member 100. For example, the bobbin 240 can be coupled (or connected) to the rear surface 100*a* of the vibration member 100 by a coupling member 280. The coupling member 280 can be a double-sided tape or a conductive double-sided tape. For example, the coupling member 280 can be configured as a double-side tape instead of resin, and thus, rework for correcting an adhesive (or attachment) position between the vibration member 100 and the bobbin 240 (or the vibration apparatus 200), replacement of the vibration apparatus 200, or desired rework can be easily performed. Further, according to an embodiment of the present disclosure, the vibration member 100 can be coupled to the bobbin 240 by a double-sided tape, and thus, the difficulty of a manufacturing process caused by the use of resin can be solved.

The bobbin 240 can be coupled (or connected) to the heat dissipation member 150 configured at a rear surface 100*a* of the vibration member 100. For example, the bobbin 240 can be coupled (or connected) to a rear surface 150*a* of the heat dissipation member 150 by a coupling member 280.

The bobbin 240 can include a circular shape, an oval shape, or a tetragonal shape, which includes a hollow portion. The hollow portion of the bobbin 240 can have a size which is greater than that of the magnet 220. Accordingly, the magnet 220 can be inserted (or accommodated) into the bobbin 240, or the bobbin 240 can be disposed to surround around the magnet 220.

The bobbin 240 according to an embodiment of the present disclosure can be configured as two or more. For example, the bobbin 240 can include a first bobbin 241 and a second bobbin 242.

The first bobbin 241 can be disposed (or configured) to surround around the first magnet 221. For example, the first bobbin 241 can be disposed at (or accommodated into) the first accommodating space 210*a* of the frame 210 to surround around the first magnet 221. For example, the first bobbin 241 can be disposed not to overlap the first magnet 221. For example, the first bobbin 241 can be disposed to be movable (or vibrated) in upward and downward along the thickness direction Z of the vibration apparatus 200, in the first accommodating space 210*a* around the first magnet 221. The first bobbin 241 can be coupled (or connected) to the rear surface 100*a* of the vibration member 100 or the rear surface 150*a* of the heat dissipation member 150 by a first coupling member 381 of the coupling member 280.

The first bobbin 241 can have a size which is greater than that of the first magnet 221 and smaller than that of the first accommodating space 210*a* of the frame 210. For example, the first bobbin 241 can be disposed at a region between the first magnet 221 and the partition wall portion 215 of the frame 210. For example, the first bobbin 241 can be surrounded by the partition wall portion 215 of the frame 210. For example, the first bobbin 241 can be disposed at a region between the first magnet 221 and the second magnet 222. For example, a lower portion of the first bobbin 241 can be spaced apart from the first magnet 221 by a certain interval and can be spaced apart from, by a certain interval, a bottom portion of the first frame portion 211 corresponding to the first accommodating space 210*a*. The first bobbin 241 can include a circular shape, an oval shape, or a tetragonal shape, which includes a hollow portion.

The second bobbin 242 can be disposed (or configured) to be spaced apart from the first bobbin 241. For example, the second bobbin 242 can be disposed (or configured) to surround around the second magnet 222. For example, the second bobbin 242 can be disposed (or configured) to surround the second magnet 222 and the partition wall portion 215 of the frame 210. For example, the second bobbin 242 can be disposed at (or accommodated into) the second accommodating space 210*b* of the frame 210 to surround around the second magnet 222. For example, the second bobbin 242 can be disposed not to overlap the second magnet 222. For example, the second bobbin 242 can be disposed to be movable (or vibrated) in upward and downward along the thickness direction Z of the vibration apparatus 200, in the second accommodating space 210*b* around the second magnet 222. The second bobbin 242 can be coupled (or connected) to the rear surface 100*a* of the vibration member 100 or the rear surface 150*a* of the heat dissipation member 150 by a second coupling member 382 of the coupling member 280.

The second bobbin 242 can have a size which is greater than that of the second magnet 222 and smaller than that of the second accommodating space 210*b* of the frame 210. For example, the second bobbin 24 can be disposed spaced apart from the second magnet 222 by a certain interval. For example, a lower portion of the second bobbin 242 can be spaced apart from the second magnet 222 by a certain interval and can be spaced apart from, by a certain interval, each of a bottom portion and a sidewall portion of the second frame 213 corresponding to the second accommodating space 210*b*. The second bobbin 242 can include a circular shape, an oval shape, or a tetragonal shape, which includes a hollow portion.

Each of the bobbin 240, the first bobbin 241, and the second bobbin 242 can include a material through which a magnet flux passes and which is low in heat conductivity. For example, each of the bobbin 240, the first bobbin 241, and the second bobbin 242 can be configured as a material obtained by processing pulp or paper, aluminum (Al), magnesium (Mg), an Al alloy, a Mg alloy, synthetic resin such as polypropylene, or polyamide-based fiber, or the like, but embodiments of the present disclosure are not limited thereto.

The coil 250 can be wound around an outer circumference surface of the bobbin 240. For example, the coil 250 can be wound around a lower portion (or a lower side) of the bobbin 240. The coil 250 can be supplied with a signal (or a current), which is for generating a vibration (or generating a sound), from the outside. The coil 250 can be referred to as a voice coil or the like. For example, the bobbin 240 and the coil 250 can be combined and referred to as a voice coil. The coil 250 can be wound around a certain region of the bobbin 240.

According to an embodiment of the present disclosure, when a signal is applied to the coil 250, the bobbin 240 can vibrate in a vertical direction along the thickness direction Z of the vibration apparatus 200 according to Fleming's left-hand rule based on an application magnetic field generated around the coil 250 and a magnetic field generated around the magnet 220. For example, a magnetic flux generated by a magnetic field can flow along a closed loop connected to the coil 250, the frame 210, the magnet 220, and the coil 250. Accordingly, the bobbin 240 can vibrate in a vertical direction to vibrate the vibration member 100.

The coil 250 according to an embodiment of the present disclosure can be configured as two or more. For example, the coil 250 can include a first coil 251 and a second coil 252.

The first coil 251 can be wound around an outer circumference surface of the first bobbin 241. For example, the first coil 251 can be wound around a lower portion (or a lower side) of the first bobbin 241. The first coil 251 can be supplied with a first signal (or a first current or a first sound signal), which is for generating a vibration (or generating a sound), from the outside.

The second coil 252 can be wound around an outer circumference surface of the second bobbin 242. For example, the second coil 252 can be wound around a lower portion (or a lower side) of the second bobbin 242. The second coil 251 can be supplied with a second signal (or a second current or a second sound signal), which is for generating a vibration (or generating a sound), from the outside.

The first signal applied to the first coil 251 can be the same as or different from a second signal applied to the second coil 252. For example, the first signal applied to the first coil 251 can have a phase which is the same as or different from that of the second signal applied to the second coil 252. For example, the first signal applied to the first coil 251 can be a signal for generating a sound of a pitched sound band which is the same as or different from that of the second signal applied to the second coil 252. For example, the first signal applied to the first coil 251 can be a signal for generating a vibration of a frequency band which is the same as or different from that of the second signal applied to the second coil 252. For example, the first signal applied to the first coil 251 can be a signal for generating a vibration (or a sound) having a high frequency (or a high-pitched sound band), but embodiments of the present disclosure are not limited thereto. The second signal applied to the second coil 252 can be a signal for generating a vibration (or a sound) having a middle-low frequency (or a middle-low-pitched sound band), but embodiments of the present disclosure are not limited thereto. For example, a middle-low frequency vibration (or a sound of the middle-low-pitched sound band) can be 3 kHz or less, a high frequency vibration (or a sound of the high-pitched sound band) can be 3 kHz or more, and a low frequency vibration (or a sound of a low-pitched sound band) can be 200 Hz or less, but embodiments of the present disclosure are not limited thereto.

The vibration apparatus 200 according to an embodiment of the present disclosure can further include a center pole 230 and a damper 260.

The center pole 230 can be disposed (or configured) on (or over) the magnet 220. The center pole 230 can be inserted (or accommodated) into the hollow portion of the bobbin 240, or can be surrounded by the bobbin 240. The center pole 230 can be configured in the same shape as the magnet 220. The center pole 230 can guide a vertical reciprocating motion of the bobbin 240. According to an embodiment of the present disclosure, the center pole 230 can be configured to have an appropriate height capable of guiding the vertical reciprocating motion of the bobbin 240. For example, the center pole 230 and the magnet 220 can be configured as one body (or a single structure body). For example, the center pole 230 can be implemented as pole pieces.

The center pole 230 according to an embodiment of the present disclosure can be configured as two or more. For example, the center pole 230 can include a first center pole 231 and a second center pole 232.

The first center pole 231 can be disposed (or configured) on (or over) the first magnet 221. The first center pole 231 can be inserted (or accommodated) into the hollow portion of the first bobbin 241, or can be surrounded by the first bobbin 241. The first center pole 231 can be configured in the same shape as the first magnet 221. The first center pole 231 can guide a vertical reciprocating motion of the first bobbin 241. According to an embodiment of the present disclosure, the first center pole 231 can be configured to have an appropriate height capable of guiding the vertical reciprocating motion of the first bobbin 241. For example, the first center pole 231 and the first magnet 221 can be configured as one body (or a single structure body). For example, the first center pole 231 can be implemented as first pole pieces.

The second center pole 232 can be disposed (or configured) on (or over) the second magnet 222. The second center pole 232 can be inserted (or accommodated) into the hollow portion of the second bobbin 242, or can be surrounded by the second bobbin 242. The second center pole 232 can be configured in the same shape as the second magnet 222. The second center pole 232 can guide a vertical reciprocating motion of the second bobbin 242. According to an embodiment of the present disclosure, the second center pole 232 can be configured to have an appropriate height capable of guiding the vertical reciprocating motion of the second bobbin 242. For example, the second center pole 232 and the second magnet 222 can be configured as one body (or a single structure body). For example, the second center pole 232 can be implemented as second pole pieces.

The damper 260 can be configured to guide a vibration of the bobbin 240. The damper 260 can be disposed at a region between the frame 210 and the bobbin 240 to guide a vibration of the bobbin 240. For example, one end (or one side) of the damper 260 can be connected (or coupled) to the frame 210, and the other end (or the other side) of the damper 260 can be connected (or coupled) to the bobbin 240. The damper 260 can have a creased structure between one end and the other end thereof. Accordingly, the damper 260 can contract and relax based on a vertical vibration (or a vertical reciprocating motion) of the bobbin 240 to adjust and guide the vibration of the bobbin 240. Therefore, the damper 260 can be connected between the frame 210 and the bobbin 240, and thus, the damper 260 can limit a vibration distance of the bobbin 240 by a restoring force. For example, when the bobbin 240 moves by a certain distance or more or vibrates by a certain distance or less, the bobbin 240 can be restored to an original position with the restoring force of the damper 260. For example, the damper 260 can be referred to as other term such as an edge, a spider, or a suspension, but embodiments of the present disclosure are not limited thereto.

The damper 260 according to an embodiment of the present disclosure can be configured as two or more. For example, the damper 260 can include a first damper 261 and a second damper 262.

The first damper 261 can be configured to guide a vibration of the first bobbin 241. The first damper 261 can be disposed at a region between a partition wall portion 215 of the frame 210 and the first bobbin 241 to guide a vibration of the first bobbin 241. For example, one end (or one side) of the first damper 261 can be connected (or coupled) to the partition wall portion 215 of the frame 210, and the other end (or the other side) of the first damper 261 can be connected (or coupled) to an outer circumference surface of the first bobbin 241. The first damper 261 can have a creased structure between one end and the other end thereof. Accordingly, the first damper 261 can contract and relax based on a vertical vibration (or a vertical reciprocating motion) of the first bobbin 241 to adjust and guide the vibration of the first bobbin 241. Therefore, the first damper 261 can be connected between the frame 210 and the first bobbin 241, and thus, the first damper 261 can limit a vibration distance of the first bobbin 241 by a restoring force. For example, when the first bobbin 241 moves by a certain distance or more or vibrates by a certain distance or less, the first bobbin 241 can be restored to an original position with the restoring force of the first damper 261.

The second damper 262 can be configured to guide a vibration of the second bobbin 242. The second damper 262 can be disposed at a region between a first frame portion 211 (or a second frame portion 213) of the frame 210 and the second bobbin 242 to guide a vibration of the second bobbin 242. For example, one end (or one side) of the second damper 262 can be connected (or coupled) to a sidewall portion of the first frame portion 211, and the other end (or the other side) of the second damper 262 can be connected (or coupled) to an outer circumference surface of the second bobbin 242. The second damper 262 can have a creased structure between one end and the other end thereof. Accordingly, the second damper 262 can contract and relax based on a vertical vibration (or a vertical reciprocating motion) of the second bobbin 242 to adjust and guide the vibration of the second bobbin 242. Therefore, the second damper 262 can be connected between the frame 210 and the second bobbin 242, and thus, the second damper 262 can limit a vibration distance of the second bobbin 242 by a restoring force. For example, when the second bobbin 242 moves by a certain distance or more or vibrates by a certain distance or less, the second bobbin 242 can be restored to an original position with the restoring force of the second damper 262.

The vibration apparatus 200 according to an embodiment of the present disclosure can further include a protection member 270.

The protection member 270 can be configured to protect the bobbin 240 from an impact or prevent a deformation of the bobbin 240 caused by an impact. The protection member 270 can be configured to protect the bobbin 240 and transfer a vibration of the bobbin 240 to the vibration member 100. The protection member 270 can vibrate together with the bobbin 240. For example, the protection member 270 can be configured to increase a coupling force between the rear surface 100*a* of the vibration member 100 and the bobbin 240. For example, the protection member 270 can be configured to prevent the detachment or stripping of the bobbin 240 from the rear surface 100*a* of the vibration member 100. For example, the protection member 270 can be a bobbin protection member, a middle member, or a bobbin ring, but embodiments of the present disclosure are not limited thereto.

The protection member 270 can be configured to be connected (or coupled) to the bobbin 240. The protection member 270 can be configured to be connected (or coupled) to an upper end portion of the bobbin 240. A rear surface of the protection member 270 can be connected (or coupled) to the bobbin 240. The rear surface of the protection member 270 can be connected (or coupled) to a rear surface 100*a* of the vibration member 100 or a rear surface 150*a* of the heat dissipation member 150. As an embodiment of the present disclosure, the protection member 270 can be adhered (or connected) to the bobbin 240 by adhesive members 275 and 276, and can be adhered (or connected) to the rear surface 100*a* of the vibration member 100 or can be adhered (or connected) to the rear surface 150*a* of the heat dissipation member 150 by a coupling member 280.

The protection member 270 can have the same shape as that of the bobbin 240. The protection member 270 can have the same shape as that of the bobbin 240 and can have a width which is greater than that of the bobbin 240. For example, the protection member 270 can be formed in an injection molding.

The protection member 270 according to an embodiment of the present disclosure can include a first protection member 271 and a second protection member 272.

The first protection member 271 can be configured to protect the first bobbin 241 from an impact or prevent a deformation of the first bobbin 241 caused by an impact. The first protection member 271 can be configured to protect the first bobbin 241 and transfer a vibration of the first bobbin 241 to the vibration member 100. The first protection member 271 can vibrate together with the first bobbin 241. The first protection member 271 can be disposed at a region between the first bobbin 241 and the vibration member 100. For example, the first protection member 271 can be configured to increase a coupling force between the rear surface 100*a* of the vibration member 100 and the first bobbin 241. For example, the first protection member 271 can be configured to prevent the detachment or stripping of the first bobbin 241 from the rear surface 100*a* of the vibration member 100. For example, the first protection member 271 can be a first bobbin protection member, a first middle member, or a first bobbin ring, but embodiments of the present disclosure are not limited thereto.

The first protection member 271 can be configured to be connected (or coupled) to the first bobbin 241. The first protection member 271 can be configured to be connected (or coupled) to an upper end portion of the first bobbin 241. A rear surface of the first protection member 271 can be connected (or coupled) to the first bobbin 241. A front surface of the first protection member 271 can be connected (or coupled) to a rear surface 100*a* of the vibration member 100 or a rear surface 150*a* of the heat dissipation member 150. As an embodiment of the present disclosure, the first protection member 271 can be adhered (or connected) to the first bobbin 241 by a first adhesive member 275 of the adhesive members 275 and 276, and can be adhered (or connected) to the rear surface 100*a* of the vibration member 100 or can be adhered (or connected) to the rear surface 150*a* of the heat dissipation member 150 by a first coupling member 281 of the coupling member 280.

The first protection member 271 can include a ring structure or a band structure having a circular shape, an oval shape, or a tetragonal shape. For example, the first protection member 271 can have a ring shape or a band shape, which includes an opening portion 271*o* overlapping a hollow portion of the first bobbin 241. For example, the first protection member 271 can have the same shape as that of the first bobbin 241. The first protection member 271 can have the same shape as that of the first bobbin 241 and can have a width which is greater than that of the first bobbin 241. For example, the first protection member 271 can be formed in an injection molding.

The first protection member 271 can be configured to surround an upper end portion of the first bobbin 241. For example, the upper end portion of the first bobbin 241 can include an uppermost surface (or an end surface) of the first bobbin 241 and an upper outer circumference surface adjacent thereto. For example, the upper end portion of the first bobbin 241 can include an end portion or an end periphery portion of the first bobbin 241. For example, the first protection member 271 can include a first groove (or a first inserting groove or a first bobbin inserting groove) which accommodates the upper end portion of the first bobbin 241. The first groove can be configured to be concave from a lower surface of the first protection member 271 overlapping or facing the first bobbin 241. Accordingly, the first protection member 271 can include a '∩'-shaped cross-sectional surface which includes a pair of sidewalls parallel to each other with the first groove therebetween.

The upper end portion of the first bobbin 241 can be inserted into the first groove of the first protection member 271. The first protection member 271 can be connected to (or coupled to) the upper end portion of the first bobbin 241 by a first adhesive member 275. For example, the first adhesive member 275 can be disposed or interposed at a region between the upper end portion of the first bobbin 241 and an inner surface of the first groove of the first protection member 271. Accordingly, a coupling force between the first bobbin 241 and the first protection member 271 can be complemented.

The second protection member 272 can be disposed (or configured) to be separated from the first protection member 271. The second protection member 272 can be disposed (or configured) to be spaced apart from the first protection member 271. For example, the second protection member 272 can be configured to protect the second bobbin 242 from an impact or prevent a deformation of the second bobbin 242 caused by an impact. The second protection member 272 can be configured to protect the second bobbin 242 and transfer a vibration of the second bobbin 242 to the vibration member 100. The second protection member 272 can vibrate together with the second bobbin 242. The second protection member 272 can be disposed at a region between the second bobbin 242 and the vibration member 100. For example, the second protection member 272 can be configured to increase a coupling force between the rear surface 100*a* of the vibration member 100 and the second bobbin 242. For example, the second protection member 272 can be configured to prevent the detachment or stripping of the second bobbin 242 from the rear surface 100*a* of the vibration member 100. For example, the second protection member 272 can be a second bobbin protection member, a second middle member, or a second bobbin ring, but embodiments of the present disclosure are not limited thereto.

The second protection member 272 can be configured to be connected (or coupled) to the second bobbin 242. The second protection member 272 can be configured to be connected (or coupled) to an upper end portion of the second bobbin 242. A rear surface of the second protection member 272 can be connected (or coupled) to the second bobbin 242. A front surface of the second protection member 272 can be connected (or coupled) to a rear surface 100*a* of the vibration member 100 or a rear surface 150*a* of the heat dissipation member 150. As an embodiment of the present disclosure, the second protection member 272 can be adhered (or connected) to the second bobbin 242 by a second adhesive member 276 of the adhesive members 275 and 276, and can be adhered (or connected) to the rear surface 100*a* of the vibration member 100 or can be adhered (or connected) to the rear surface 150*a* of the heat dissipation member 150 by a second coupling member 282 of the coupling member 280.

The second protection member 272 can include a ring structure or a band structure having a circular shape, an oval shape, or a tetragonal shape. For example, the second protection member 272 can have a ring shape or a band shape, which includes an opening portion 272*o* overlapping a hollow portion of the second bobbin 242. For example, the second protection member 272 can have the same shape as that of the second bobbin 242. The second protection member 272 can have the same shape as that of the second bobbin 242 and can have a width which is greater than that of the second bobbin 242. For example, the second protection member 272 can be formed in an injection molding.

The second protection member 272 can be configured to surround an upper end portion of the second bobbin 242. For example, the upper end portion of the second bobbin 242 can include an uppermost surface (or an end surface) of the second bobbin 242 and an upper outer circumference surface adjacent thereto. For example, the upper end portion of the second bobbin 242 can include an end portion or an end periphery portion of the second bobbin 242. For example, the second protection member 272 can include a second groove (or a second inserting groove or a second bobbin inserting groove) which accommodates the upper end portion of the second bobbin 242. The second groove can be configured to be concave from a lower surface of the second protection member 272 overlapping or facing the second bobbin 242. Accordingly, the second protection member 272 can include a '∩'-shaped cross-sectional surface which includes a pair of sidewalls parallel to each other with the second groove therebetween.

The upper end portion of the second bobbin 242 can be inserted into the second groove of the second protection member 272. The second protection member 272 can be connected to (or coupled to) the upper end portion of the second bobbin 242 by a second adhesive member 276. For example, the second adhesive member 276 can be disposed or interposed at a region between the upper end portion of the second bobbin 242 and an inner surface of the second groove of the second protection member 272. Accordingly, a coupling force between the second bobbin 242 and the second protection member 272 can be complemented.

An upper surface (or an uppermost surface) of the first protection member 271 can be disposed or positioned on the same line or plane as an upper surface (or an uppermost surface) of the second protection member 272.

The protection member 270, the first protection member 271, and the second protection member 272 can be configured as a fiber reinforced material, a complex resin including fiber reinforced material, or metal material, thereby performing a heat dissipation function dissipating heat generated by the driving (or vibrating) of the vibration device 200. For example, the fiber reinforced materials can be any one of carbon fiber reinforced plastics, glass fiber reinforced plastics, and graphite fiber reinforced plastics, or can be a combination, but embodiments of the present disclosure are not limited thereto. The carbon fiber has a small thermal expansion coefficient, so that it has good stability. Further, the carbon fiber has good electro-conductivity, high corrosion resistance, good vibration attenuation properties, and good X-ray transmission properties. Further, the glass fiber is lightweight and has good durability, good shock resistance, and good resistance to abrasion. In addition, the glass fiber is anti-rust (e.g., does not corrode), has a low coefficient of heat conduction, and is easily processed. For example, the metal material can be aluminum (Al), but embodiments of the present disclosure are not limited thereto.

The first adhesive member 275 and the second adhesive member 276 between the bobbin 240 and the protection member 270 can be an adhesive resin. For example, the adhesive resin can be an epoxy resin or an acrylic resin, but embodiments of the present disclosure are not limited thereto.

In the vibration apparatus according to an embodiment of the present disclosure, a sound of the high-pitched sound band can be output in a forward direction FD of the apparatus, based on a vibration of a first region of the vibration member 100 based on a vibration of the first bobbin 241, and a sound of the middle-low-pitched sound band can be output in the forward direction FD of the apparatus, based on a vibration of a second region of the vibration member 100 based on a vibration of the second bobbin 242. The first bobbin 241 and the second bobbin 242 can be separated (or spaced apart) from each other and can each vibrate independently, and thus, a sound of the high-pitched sound band based on a vibration of the first bobbin 241 and a sound of the middle-low-pitched sound band based on a vibration of the second bobbin 242 can be divisionally output, thereby enhancing a sound characteristic and a sound pressure level characteristic. The first protection member 271 connected to the first bobbin 241 and the second protection member 272 connected to the second bobbin 242 can be physically separated (or spaced apart) from each other, and thus, a peak phenomenon and/or a dip phenomenon of a sound (or a sound pressure level) caused by interference between a vibration of the first bobbin 241 and a vibration of the second bobbin 242 can be minimized. Each of the first bobbin 241 and the second bobbin 242 can independently vibrate based on a frequency, or a vibration of the first bobbin 241 and a vibration of the second bobbin 242 can be separated from each other, and thus, a total harmonic distortion characteristic can be reduced, thereby enhancing the quality of a sound and a sound pressure level characteristic of a sound.

The total harmonic distortion characteristic occurs when, due to a nonlinearity of a sound device such as a speaker, a signal that is not actually input appears in an output, and is a method of showing a nonlinearity of a sound device. For example, the total harmonic distortion characteristic occurs when a pure tone or a pure sound is input to a sound device, and a frequency that was not input appears in an output due to harmonic distortion in which harmonics corresponding to an integer multiple, such as two times, three times, and four times, of the pure sound appear in an output. The harmonic distortion can occur when a sound source signal equal to or greater than an input limit of a sound device is input, and a waveform can be clipped, and can occur when, as a harmonic component increases, a total harmonic distortion characteristic value increases, and distortion of a waveform can be severe.

The apparatus according to an embodiment of the present disclosure can output a sound in the forward direction FD of the vibration member 100, based on a vibration of the vibration member 100. The apparatus according to an embodiment of the present disclosure can output a sound having the high-pitched sound band and the middle-low-pitched sound band or can separate and divisionally output a sound of the high-pitched sound band and a sound of the middle-low-pitched sound band in the forward direction FD of the vibration member 100, based on a vibration of the vibration member 100 based on an independent vibration of each of the first and second bobbins 241 and 242 of the vibration apparatus 200. In the apparatus according to an embodiment of the present disclosure, a characteristic of a sound and/or a sound pressure level characteristic of a sound generated based on a vibration of the vibration member, and a total harmonic distortion characteristic generated based on a vibration of the vibration member can be reduced, thereby enhancing the quality of a sound and a sound pressure level characteristic of a sound.

FIGS. 5A to 5D are diagrams illustrating a protection member according to another embodiment of the present disclosure. Particularly, FIGS. 5A to 5D illustrate an embodiment where a compensation member is additionally configured at the first protection member of the protection member illustrated in FIGS. 3 and 4.

Figure 5A:
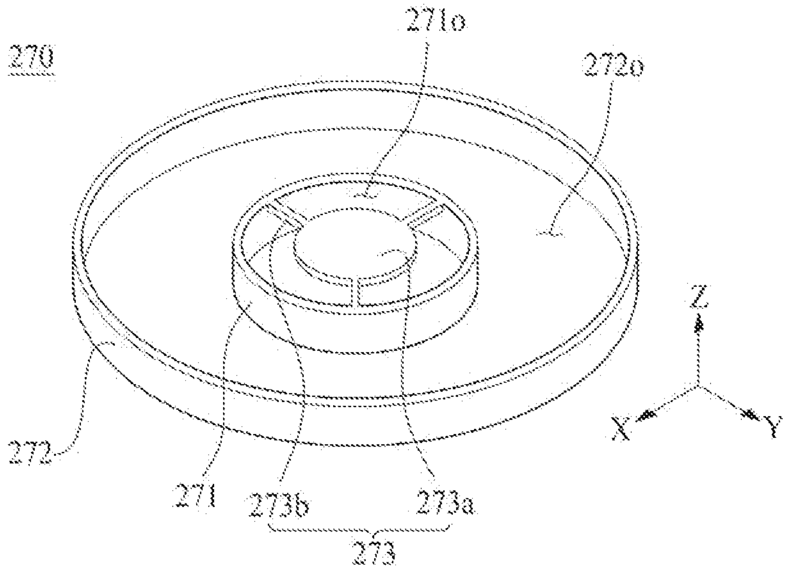
FIGS. 5A to 5D are diagrams illustrating a protection member according to another embodiment of the present disclosure.
Figure 5B:
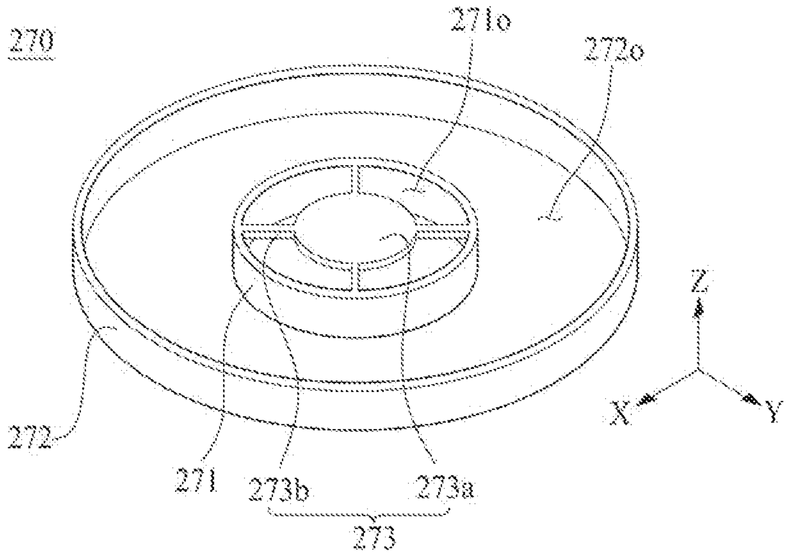

With reference to FIGS. 3, 5A, and 5B, a protection member 270 according to another embodiment of the present disclosure can include a first protection member 271, a second protection member 272, and a compensation member 273.

The first protection member 271 and the second protection member 272 can be substantially the same as the first protection member 271 and the second protection member 272 described above with reference to FIGS. 3 and 4, and thus, like reference numerals refer to like elements and repeated descriptions thereof are omitted or may be briefly provided.

The compensation member 273 can be configured to minimize or prevent an eccentric vibration of one or more of the first protection member 271 and the second protection member 272. For example, the compensation member 273 can be configured to minimize or prevent an eccentric vibration of one or more of the first bobbin 241 and the second bobbin 242. For example, when an eccentric vibration occurs in one or more of the first bobbin 241 and the second bobbin 242, a sound characteristic and/or a sound pressure level characteristic can be reduced due to an undesired vibration of the vibration member 100, and the reliability of one or more of the first bobbin 241 and the second bobbin 242 can decrease. The compensation member 273 can minimize or prevent an eccentric vibration of one or more of the first protection member 271 and the second protection member 272, and thus, a characteristic and/or a sound pressure level characteristic of a sound generated based on a vibration of the vibration apparatus 200 can be enhanced. For example, the compensation member 273 can be a compensation structure, an eccentric vibration prevention member, or an eccentric prevention member, but embodiments of the present disclosure are not limited thereto.

The compensation member 273 according to an embodiment of the present disclosure can include a center member **273*a* and a plurality of connection lines 273*b***.

The center member **273*a* can be disposed at a center portion of the first protection member 271. For example, the center member 273*a* can be disposed in an island shape at a center portion of the first protection member 271. For example, the center member 273*a*** can be disposed at the opening portion 271*o*. For example, the center member 273*a* can be disposed at the opening portion 271*o* of the first protection member 271 to overlap the hollow portion of the first bobbin 241. For example, the center member 273*a* can be disposed to cover a center portion of the opening portion 271*o* of the first protection member 271. For example, a center portion (or a center point) of the center member 273*a* can be positioned or aligned at the center portion of the opening portion 271*o* of the first protection member 271. For example, the center member 273*a* can be a common member or a secondary member.

The center member 273*a* can include a plate structure having a circular shape, an oval shape, or a tetragonal shape. For example, the center member 273*a* can have the same shape as the first protection member 271 or the first bobbin 241. The center member 273*a* can have a smaller size than the first protection member 271. A lateral surface (or an outer sidewall) of the center member 273*a* can be spaced apart from an inner surface (or an inner sidewall) of the first protection member 271 by a certain distance.

With respect to a thickness direction Z of the first bobbin 241, a thickness of the center member 273*a* can be equal to that of the first protection member 271, or can be smaller than that of the first protection member 271. For example, in order to minimize an increase in weight of the first protection member 271 and/or the first bobbin 241, a thickness of the center member 273*a* can be smaller than that of a thickness of the first protection member 271. For example, an eccentric vibration of the first protection member 271 and/or the first bobbin 241 can be affected by a weight of the first protection member 271 and/or the first bobbin 241, and thus, a thickness of the center member 273*a* can be smaller than half of a thickness of the first protection member 271.

The plurality of connection lines 273*b* can be disposed (or configured) at a region between the first protection member 271 and the center member 273*a*. For example, A plurality of connection lines 273*b* can be configured to be connected between the first protection member 271 and the center member 273*a*. For example, the plurality of connection lines 273*b* can be configured to have a certain interval between the first protection member 271 and the center member 273*a*. Each of the plurality of connection lines 273*b* can be configured to face a center portion (or a center point) of the first protection member 271 and the center member 273*a*. For example, each of the plurality of connection lines 273*b* can be a connection portion, a first connection portion, a first connection line, a first compensation line, a bridge, a first bridge, a bridge line, or a first bridge line, but embodiments of the present disclosure are not limited thereto.

Each of the plurality of connection lines 273*b* can be connected between a lateral surface (or an outer sidewall) of the center member 273*a* and an inner surface (or an inner sidewall) of the first protection member 271. For example, the plurality of connection lines 273*b* can be configured to divide an opening portion 271*o* between the first protection member 271 and the center member 273*a* into a plurality of regions. For example, each of the first protection member 271 and the center member 273*a* can be divided into a plurality of regions, and each of the plurality of connection lines 273*b* can be connected between a corresponding division region of a plurality of division regions of the first protection member 271 and a corresponding division region of a plurality of division regions of the center member 273*a*.

With respect to a thickness direction Z of the first protection member 271, a thickness of each of the plurality of connection lines 273*b* can be equal to that of the first protection member 271 or the center member 273*a*, or can be smaller than that of the first protection member 271 or the center member 273*a*. For example, in order to minimize an increase in weight of the first protection member 271 and/or the first bobbin 241, a thickness of each of the plurality of connection lines 273*b* can be smaller than that of a thickness of the first protection member 271 or a thickness of the center member 273*a*. For example, a thickness of each of the plurality of connection lines 273*b* can be smaller than half of a thickness of the first protection member 271 or the center member 273*a*.

With respect to the thickness direction Z of the first protection member 271, an upper surface of the first protection member 271, an upper surface of the center member 273*a*, and an upper surface of each of the plurality of connection lines 273*b* can be disposed on the same line and/or plane. For example, an uppermost surface of the first protection member 271, an uppermost surface of the center member 273*a*, and an uppermost surface of each of the plurality of connection lines 273*b* can be disposed on the same line and/or plane.

The compensation member 273 can be coupled (or connected) to the vibration member 100 or the heat dissipation member 150 together with the first protection member 271 by a first coupling member 281 of a coupling member 280. For example, each of the center member 273*a* and the plurality of connection lines 273*b* can be coupled (or connected) to a rear surface 100*a* of the vibration member 100 or a rear surface 150*a* of the heat dissipation member 150 together with the first protection member 271 by the first coupling member 281, and thus, the flatness of the first protection member 271 coupled to the heat dissipation member 150 or the vibration member 100 by the first coupling member 281 can be improved and a coupling force between the first protection member 271 and the heat dissipation member 150 or the vibration member 100 can be complemented.

Each of the center member 273*a* and the plurality of connection lines 273*b* can be integrated with the first protection member 271. For example, the first protection member 271, the center member 273*a*, and the plurality of connection lines 273*b* can be configured as one structure (or a single structure) or one component (or a single component, or a single part, or one part). For example, each of the center member 273*a* and the plurality of connection lines 273*b* can include the same material as that of the first protection member 271.

The compensation member 273 according to an embodiment of the present disclosure, as illustrated in FIG. 5A, can include three connection lines 273*b*. An angle between the three connection lines 273*b* can be 120 degrees. Each of the three connection lines 273*b* can be connected between the lateral surface (or the outer sidewall) of the center member 273*a* and the inner surface (or the inner sidewall) of the first protection member 271. Each of the three connection lines 273*b* can be configured to face the center portion (or the center point) of the center member 273*a* or the first protection member 271.

The compensation member 273 according to another embodiment of the present disclosure, as illustrated in FIG. 5B, can include four connection lines 273*b*. An angle between the four connection lines 273*b* can be 90 degrees. Each of the four connection lines 273*b* can be connected between the lateral surface (or the outer sidewall) of the center member 273*a* and the inner surface (or the inner sidewall) of the first protection member 271. Each of the four connection lines 273*b* can be configured to face the center portion (or the center point) of the center member 273*a* or the first protection member 271.

Figure 5C:
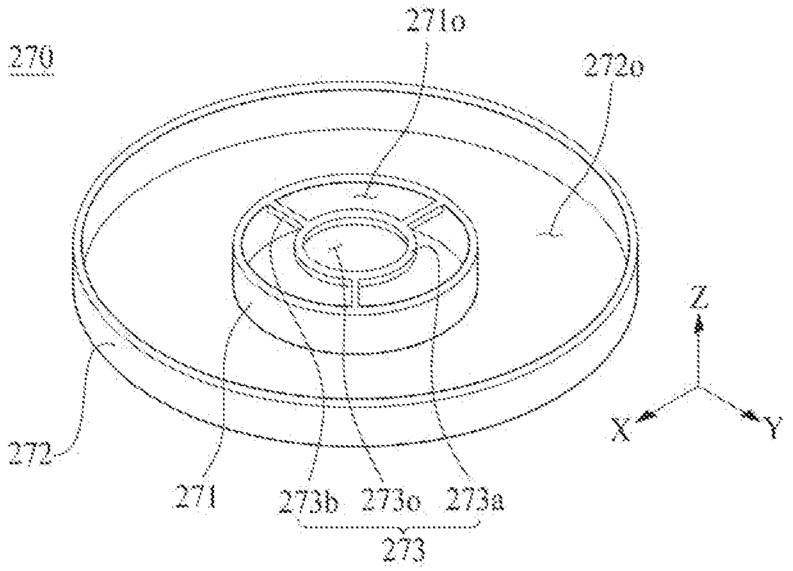
Figure 5D:
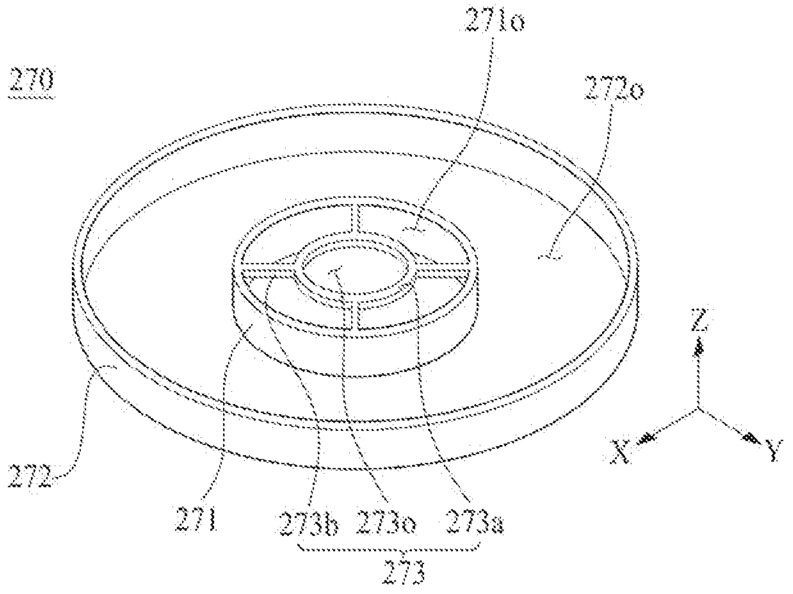

With reference to FIGS. 3, 5C, and 5D, the center member 273*a* of the compensation member 270 can include a ring structure or a band structure having a hollow portion 273*o*. For example, except for that a center member 273*a* has a ring structure or a band structure including the hollow portion 273*o*, the center member 273*a* according to another embodiment of the present disclosure can be substantially the same as the center member 273*a* described above with reference to FIGS. 5A and 5B, and thus, repeated descriptions thereof are omitted or may be briefly provided.

Because the center member 273*a* according to another embodiment of the present disclosure includes the hollow portion 273*o*, an eccentric vibration of a first protection member 271 and/or a first bobbin 241 can be prevented or minimized while minimizing an increase in weight of the first protection member 271 and/or the first bobbin 241, and the eccentric vibration of the first protection member 271 and/or the first bobbin 241 can be prevented or minimized without hindering a heat dissipation path through which heat occurring in a vibration apparatus 200 or a coil 250 is transferred to a heat dissipation member 150.

Figure 6A:
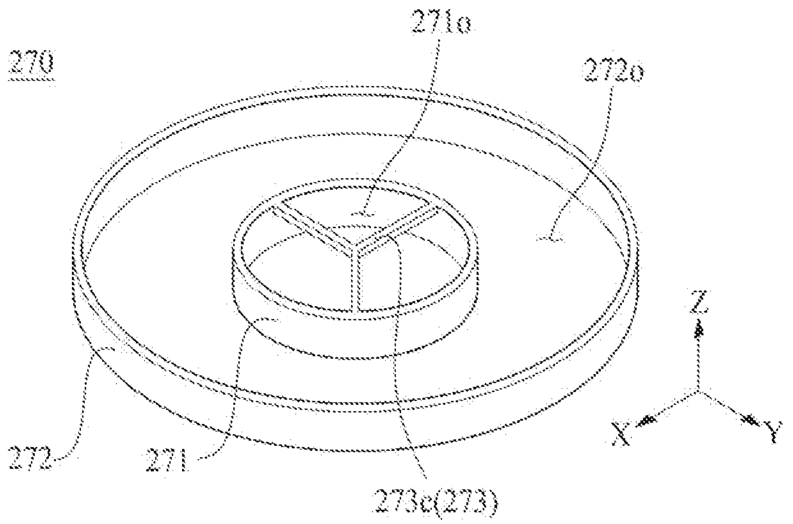
FIGS. 6A to 6C are diagrams illustrating a protection member according to another embodiment of the present disclosure.
Figure 6B:
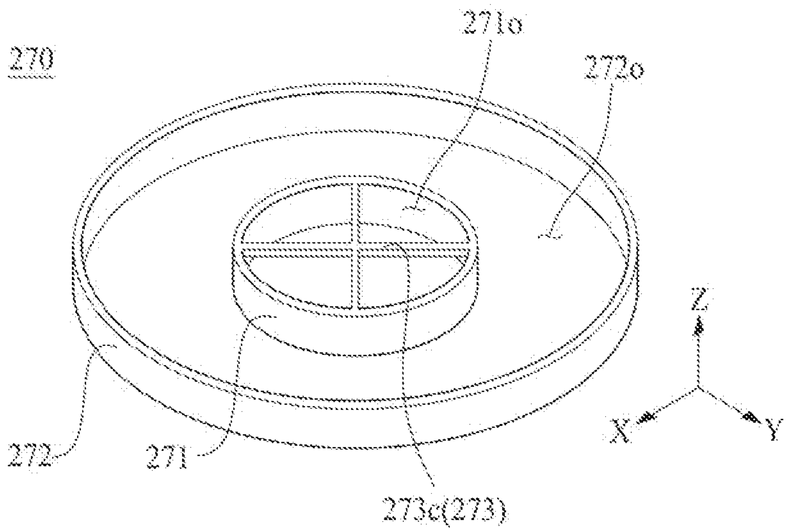
Figure 6C:
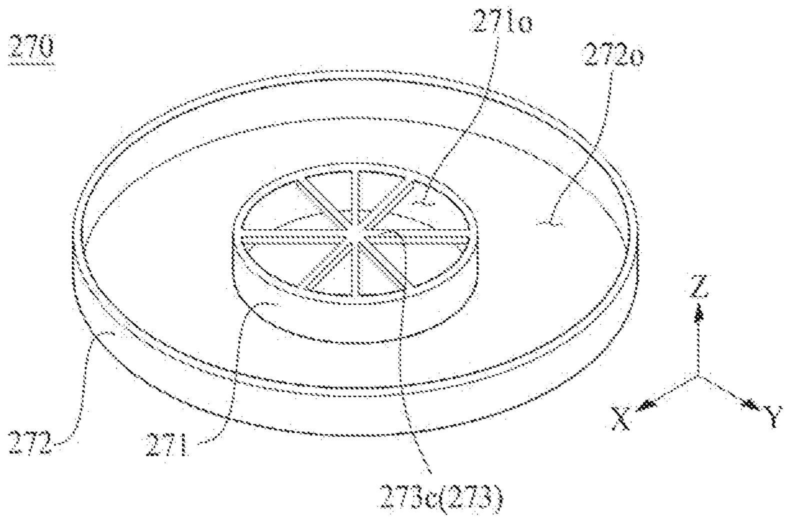

FIGS. 6A to 6C are diagrams illustrating a protection member according to another embodiment of the present disclosure. Particularly, FIGS. 6A to 6C illustrate an embodiment implemented by modifying the compensation member illustrated in FIGS. 5A to 5D. In the following description, therefore, the other elements except the compensation member and relevant elements are referred to like reference numerals and repeated descriptions thereof are omitted or may be briefly provided.

With reference to FIGS. 3 and 6A to 6C, a compensation member 273 of a protection member 270 according to another embodiment of the present disclosure can include a plurality of connection lines 273*c*.

The plurality of connection lines 273*c* can be disposed at an opening portion 271*o* of the first protection member 271. For example, the plurality of connection lines 273*c* can be connected to an inner surface (or an inner sidewall) of a first protection member 271 to cross the opening portion 271*o* of the first protection member 271. For example, the plurality of connection lines 273*c* can be connected to one another at a center portion (or a center point) of the opening portion 271*o* of the first protection member 271. For example, each of the plurality of connection lines 273*c* can be a connection portion, a first connection portion, a first compensation line, a bridge, a first bridge, a bridge line, or a first bridge line, but embodiments of the present disclosure are not limited thereto.

One side (or one end) of each of the plurality of connection lines 273*c* can be connected to the inner surface (or the inner sidewall) of the first protection member 271. The other sides (or the other ends) of the plurality of connection lines 273*c* can be connected to one another at the opening portion 271*o* of the first protection member 271. For example, one side (or one end) of each of the plurality of connection lines 273*c* can extend or protrude toward the center portion (or the center point) of the opening portion 271*o* of the first protection member 271 from the inner surface (or the inner sidewall) of the first protection member 271.

Each of the plurality of connection lines 273*c* can be configured to divide an opening portion 271*o* into a plurality of regions. For example, the first protection member 271 can be divided into a plurality of regions, and one side (or one end) of each of the plurality of connection lines 273*c* can be connected to a corresponding division region of the plurality of division regions of the first protection member 271.

With respect to a thickness direction Z of the first protection member 271, a thickness of each of the plurality of connection lines 273*c* can be equal to that of the first protection member 271, or can be smaller than that of the first protection member 271. For example, in order to minimize an increase in weight of the first protection member 271 and/or the first bobbin 241, a thickness of each of the plurality of connection lines 273*c* can be smaller than that of a thickness of the first protection member 271. For example, a thickness of each of the plurality of connection lines 273*c* can be smaller than half of a thickness of the first protection member 271.

With respect to the thickness direction Z of the first protection member 271, an upper surface of the first protection member 271 and an upper surface of each of the plurality of connection lines 273*c* can be disposed on the same line and/or plane. For example, an uppermost surface of the first protection member 271 and an uppermost surface of each of the plurality of connection lines 273*c* can be disposed on the same line and/or plane.

The compensation member 273 can be coupled (or connected) to the vibration member 100 or the heat dissipation member 150 together with the first protection member 271 by a first coupling member 281 of a coupling member 280. For example, each of the plurality of connection lines 273*c* can be coupled (or connected) to a rear surface 100*a* of the vibration member 100 or a rear surface 150*a* of the heat dissipation member 150 together with the first protection member 271 by the first coupling member 281, and thus, the flatness of the first protection member 271 coupled to the heat dissipation member 150 or the vibration member 100 by the first coupling member 281 can be improved and a coupling force between the first protection member 271 and the heat dissipation member 150 or the vibration member 100 can be complemented.

Each of the plurality of connection lines 273*c* can be integrated with the first protection member 271. For example, the first protection member 271 and the plurality of connection lines 273*c* can be configured as one structure (or a single structure) or one component (or a single component, or a single part, or one part). For example, each of the plurality of connection lines 273*c* can include the same material as that of the first protection member 271.

The compensation member 273 according to another embodiment of the present disclosure, as illustrated in FIG. 6A, can include three connection lines 273*c*. An angle between the three connection lines 273*c* can be 120 degrees. One side (or one end) of each of the three connection lines 273*c* can be connected to a lateral surface (or an outer sidewall) of the first protection member 271. The other sides (or the other ends) of each of the three connection lines 273*c* can be connected to each other at a center portion (or a center point) of an opening portion 271*o* of the first protection member 271. For example, the three connection lines 273*c* can be one-dimensionally configured to have a 'Y'-shape. For example, the three connection lines 273*c* can be configured to have a 'Y'-shape in plan view.

The compensation member 273 according to another embodiment of the present disclosure, as illustrated in FIG. 6B, can include four connection lines 273*c*. An angle between the four connection lines 273*c* can be 90 degrees. One side (or one end) of each of the four connection lines 273*c* can be connected to a lateral surface (or an outer sidewall) of the first protection member 271. The other sides (or the other ends) of each of the four connection lines 273*c* can be connected to each other at a center portion (or a center point) of an opening portion 271*o* of the first protection member 271. For example, the four connection lines 273*c* can be one-dimensionally configured to have a '+'-shape. For example, the three connection lines 273*c* can be configured to have a '+'-shape in plan view.

The compensation member 273 according to another embodiment of the present disclosure, as illustrated in FIG. 6C, can include eight connection lines 273*c*. An angle between the eight connection lines 273*c* can be 45 degrees. One side (or one end) of each of the eight connection lines 273*c* can be connected to a lateral surface (or an outer sidewall) of the first protection member 271. The other sides (or the other ends) of each of the eight connection lines 273*c* can be connected to each other at a center portion (or a center point) of an opening portion 271*o* of the first protection member 271. For example, the eight connection lines 273*c* can be one-dimensionally configured to have a combination structure of a '+'-shape and a 'x'-shape. For example, the eight connection lines 273*c* can be configured to have a combination structure of a '+'-shape and a 'x'-shape in plan view.

Because the compensation member 273 according to another embodiment of the present disclosure includes the plurality of connection lines 273*c*, an eccentric vibration of the first protection member 271 and/or a first bobbin 241 can be prevented or minimized while minimizing an increase in weight of the first protection member 271 and/or the first bobbin 241, and the eccentric vibration of the first protection member 271 and/or the first bobbin 241 can be prevented or minimized without hindering a heat dissipation path through which heat occurring in a vibration apparatus 200 or a coil 250 is transferred to a heat dissipation member 150.

Figure 7A:
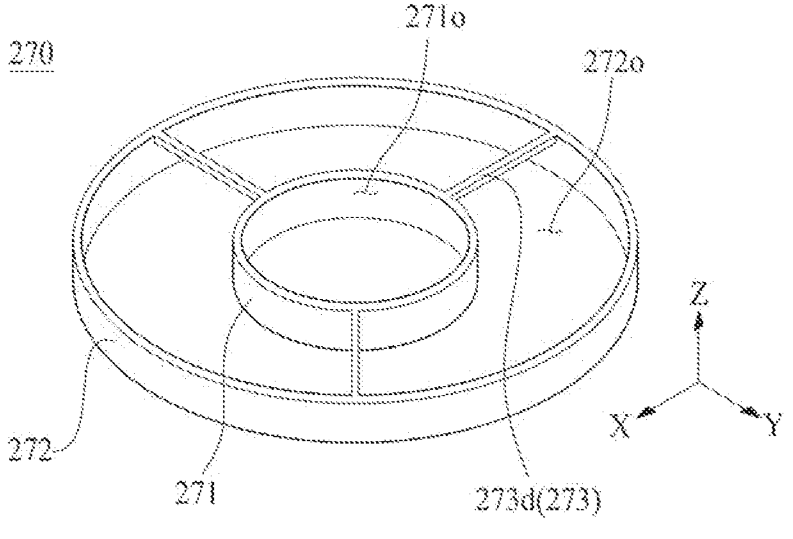
FIGS. 7A to 7C are diagrams illustrating a protection member according to another embodiment of the present disclosure.
Figure 7B:
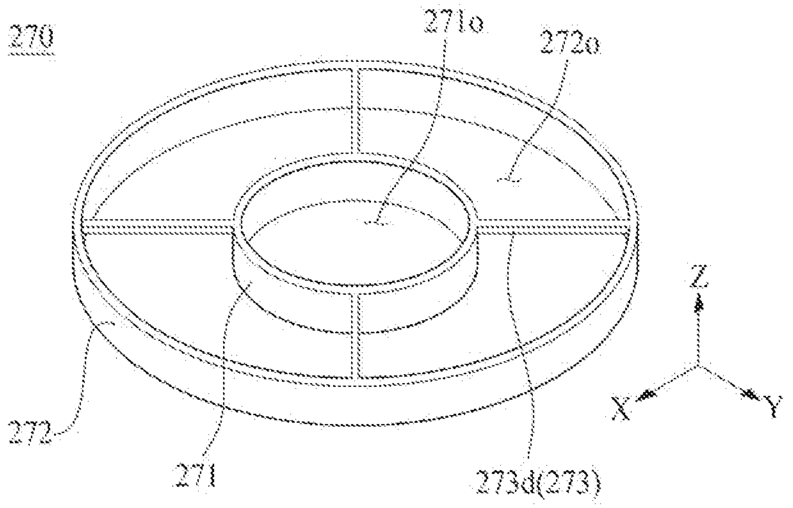
Figure 7C:
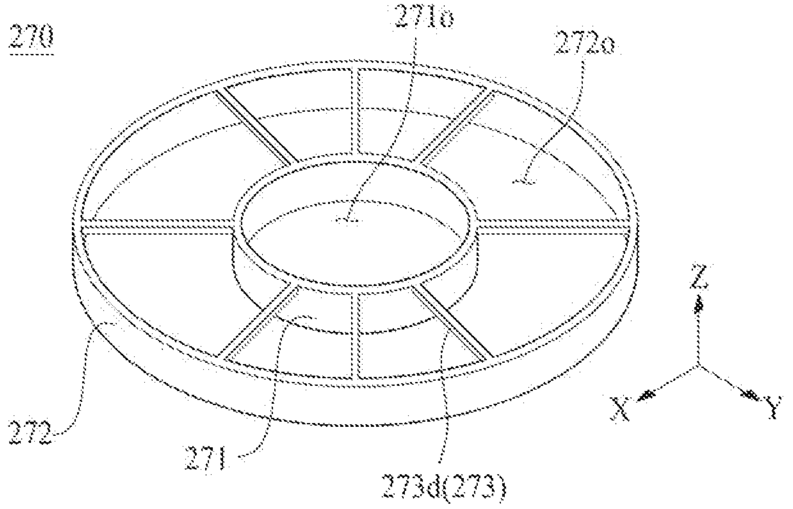

FIGS. 7A to 7C are diagrams illustrating a protection member according to another embodiment of the present disclosure. Particularly, FIGS. 7A to 7C illustrate an embodiment where a compensation member is additionally configured at the protection member illustrated in FIGS. 3 and 4.

With reference to FIGS. 3, 4, and 7A to 7C, a protection member 270 according to another embodiment of the present disclosure can include a first protection member 271, a second protection member 272, and a compensation member 273.

The first protection member 271 and the second protection member 272 can be substantially the same as the first protection member 271 and the second protection member 272 described above with reference to FIGS. 3 and 4, and thus, like reference numerals refer to like elements and repeated descriptions thereof are omitted or may be briefly provided.

The compensation member 273 can be configured to minimize or prevent an eccentric vibration of one or more of the first protection member 271 and the second protection member 272. For example, the compensation member 273 can be configured to minimize or prevent an eccentric vibration of one or more of the first bobbin 241 and the second bobbin 242. For example, when an eccentric vibration occurs in one or more of the first bobbin 241 and the second bobbin 242, a sound characteristic and/or a sound pressure level characteristic can be reduced due to an undesired vibration of the vibration member 100, and the reliability of one or more of the first bobbin 241 and the second bobbin 242 can decrease. The compensation member 273 can minimize or prevent an eccentric vibration of one or more of the first protection member 271 and the second protection member 272, and thus, a characteristic and/or a sound pressure level characteristic of a sound generated based on a vibration of the vibration apparatus 200 can be enhanced.

The compensation member 273 according to an embodiment of the present disclosure can include a plurality of connection lines 273*d*.

The plurality of connection lines 273*d* can be disposed (or configured) at a region between the first protection member 271 and the second protection member 272. For example, A plurality of connection lines 273*d* can be configured to be connected between the first protection member 271 and the second protection member 272. For example, the plurality of connection lines 273*d* can be configured to have a certain interval between the first protection member 271 and the second protection member 272. Each of the plurality of connection lines 273*d* can be configured to face a center portion (or a center point) of the first protection member 271. For example, each of the plurality of connection lines 273*d* can be a second connection portion, a second connection line, a second compensation line, a second bridge, or a second bridge line, but embodiments of the present disclosure are not limited thereto.

Each of the plurality of connection lines 273*d* can be connected between an outer lateral surface (or an outer sidewall) of the first protection member 271 and an inner surface (or an inner sidewall) of the second protection member 272. For example, the plurality of connection lines 273*d* can be configured to divide an opening portion 271*o* between the first protection member 271 and the second protection member 272 into a plurality of regions. For example, each of the first protection member 271 and the second protection member 272 can be divided into a plurality of regions, and each of the plurality of connection lines 273*d* can be connected between a corresponding division region of a plurality of division regions of the first protection member 271 and a corresponding division region of a plurality of division regions of the second protection member 272.

With respect to a thickness direction Z of the first protection member 271, a thickness of each of the plurality of connection lines 273*d* can be equal to that of the first protection member 271, or can be smaller than that of the first protection member 271. For example, in order to minimize an increase in weight of the protection member 270 and/or the first bobbin 241, a thickness of each of the plurality of connection lines 273*d* can be smaller than that of a thickness of the first protection member 271. For example, a thickness of each of the plurality of connection lines 273*d* can be smaller than half of a thickness of the first protection member 271.

With respect to the thickness direction Z of the first protection member 271, an upper surface of the first protection member 271, an upper surface of the second protection member 272, and an upper surface of each of the plurality of connection lines 273*d* can be disposed on the same line and/or plane. For example, an uppermost surface of the first protection member 271, an uppermost surface of the second protection member 272, and an uppermost surface of each of the plurality of connection lines 273*b* can be disposed on the same line and/or plane.

The compensation member 273 can be coupled (or connected) to the vibration member 100 or the heat dissipation member 150 together with the first and second protection members 271 and 272 by a first coupling member 281 of a coupling member 280. For example, each of the plurality of connection lines 273*d* can be coupled (or connected) to a rear surface 100*a* of the vibration member 100 or a rear surface 150*a* of the heat dissipation member 150 together with the first and second protection members 271 and 272 by the first coupling member 281, and thus, the flatness of the first and second protection members 271 and 272 coupled to the heat dissipation member 150 or the vibration member 100 by the first coupling member 281 can be improved and a coupling force between the first and second protection members 271 and 272 and the heat dissipation member 150 or the vibration member 100 can be complemented.

Each of the plurality of connection lines 273*d* can be integrated with the first and second protection members 271 and 272. For example, the first protection member 271, the second protection member 272, and the plurality of connection lines 273*b* can be configured as one structure (or a single structure) or one component (or a single component, or a single part, or one part). For example, each of the plurality of connection lines 273*d* can include the same material as that of the first and second protection members 271 and 272.

The compensation member 273 according to another embodiment of the present disclosure, as illustrated in FIG. 7A, can include three connection lines 273*d*. An angle between the three connection lines 273*d* can be 120 degrees. One side (or one end) of each of the three connection lines 273*d* can be connected to the inner surface (or the inner sidewall) of the second protection member 272. The other sides (or the other ends) of each of the three connection lines 273*d* can be connected to the outer lateral surface (or the outer sidewall) of the first protection member 271. For example, the three connection lines 273*d* can be one-dimensionally configured to have a 'Y'-shape. For example, the three connection lines 273*d* can be configured to have a 'Y'-shape in plan view.

The compensation member 273 according to another embodiment of the present disclosure, as illustrated in FIG. 7B, can include four connection lines 273*d*. An angle between the four connection lines 273*d* can be 90 degrees. One side (or one end) of each of the four connection lines 273*d* can be connected to the inner surface (or the inner sidewall) of the second protection member 272. The other sides (or the other ends) of each of the four connection lines 273*d* can be connected to the outer lateral surface (or the outer sidewall) of the first protection member 271. For example, the four connection lines 273*d* can be one-dimensionally configured to have a '+'-shape. For example, the four connection lines 273*d* can be configured to have a '+'-shape in plan view.

The compensation member 273 according to another embodiment of the present disclosure, as illustrated in FIG. 7C, can include eight connection lines 273*d*. An angle between the eight connection lines 273*d* can be 45 degrees. One side (or one end) of each of the eight connection lines 273*d* can be connected to the inner surface (or the inner sidewall) of the second protection member 272. The other sides (or the other ends) of each of the eight connection lines 273*d* can be connected to the outer lateral surface (or the outer sidewall) of the first protection member 271. For example, the eight connection lines 273*d* can be one-dimensionally configured to have a combination structure of a '+'-shape and a 'x'-shape. For example, the eight connection lines 273*d* can be configured to have a combination structure of a '+'-shape and a 'x'-shape in plan view.

Because the compensation member 273 according to another embodiment of the present disclosure includes the plurality of connection lines 273*d*, an eccentric vibration of the first and second protection members 271 and 272 and/or first and second bobbins 241 and 242 can be prevented or minimized while minimizing an increase in weight of the first and second protection members 271 and 272 and/or first and second bobbins 241 and 242, and the eccentric vibration of the first and second protection members 271 and 272 and/or first and second bobbins 241 and 242 can be prevented or minimized without hindering a heat dissipation path through which heat occurring in a vibration apparatus 200 or a coil 250 is transferred to a heat dissipation member 150.

FIGS. 8A to 8D are diagrams illustrating a protection member according to another embodiment of the present disclosure. Particularly, FIGS. 8A to 8D illustrate an embodiment where a compensation member described above with reference to FIGS. 7A to 7C is additionally configured at the protection member illustrated in FIGS. 5A to 5D. In the following description, therefore, the other elements except the compensation member and relevant elements are referred to like reference numerals and repeated descriptions thereof are omitted or may be briefly provided.

Figure 8A:
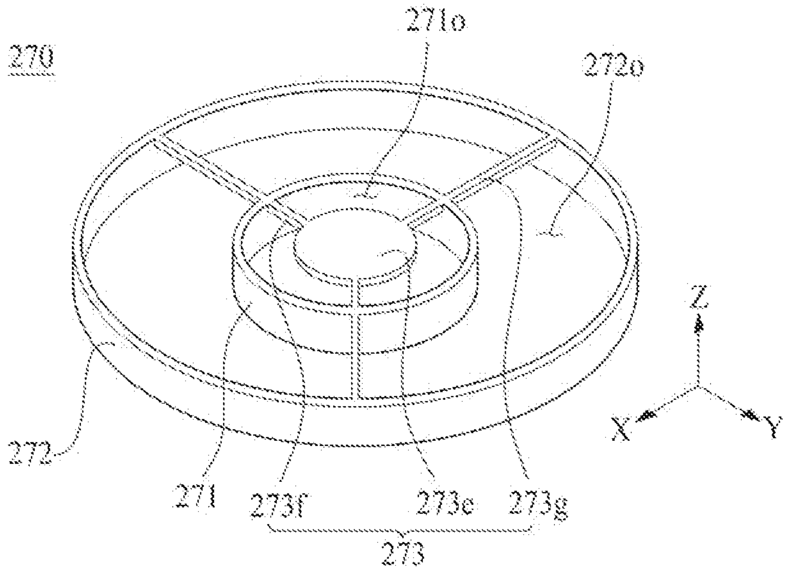
FIGS. 8A to 8D are diagrams illustrating a protection member according to another embodiment of the present disclosure.
Figure 8B:
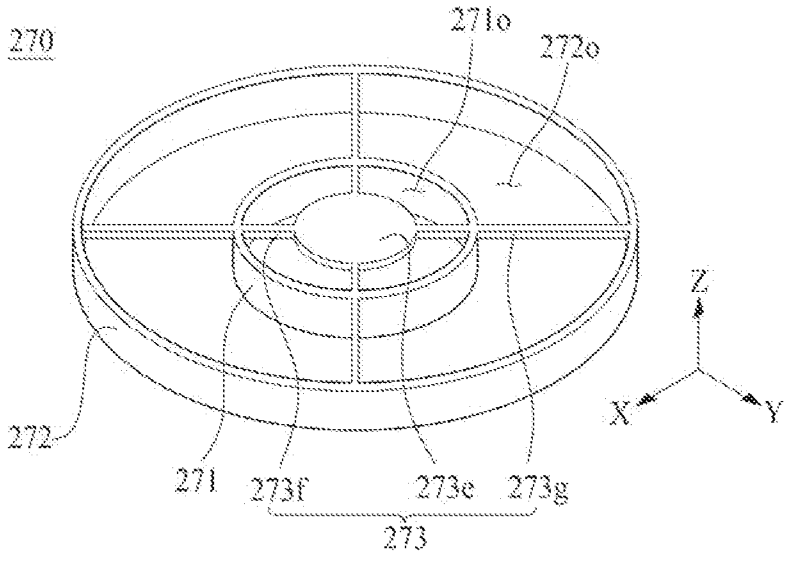

With reference to FIGS. 3, 8A, and 8B, a compensation member 273 of a protection member 270 according to another embodiment of the present disclosure can include a center member 273*e*, a plurality of first connection lines 273*f*, and a plurality of second connection lines 273*g*.

The center member 273*e* and the plurality of first connection lines 273*f* can be configured at a first protection member 271. Each of the center member 273*e* and the plurality of first connection lines 273*f* can be substantially the same as each of the center member 273*a* and the plurality of connection lines 273*b* described above with reference to FIGS. 5A and 5B, and thus, repeated descriptions thereof are omitted or may be briefly provided.

The plurality of second connection lines 273*g* can be disposed (or configured) between the first protection member 271 and a second protection member 272. The plurality of second connection lines 273*g* can be substantially the same as each of the plurality of connection lines 273*d* described above with reference to FIGS. 7A and 7B, and thus, repeated descriptions thereof are omitted or may be briefly provided.

The plurality of second connection lines 273*g* can be disposed on the same line as the plurality of first connection lines 273*f*. For example, an extension line of each of the plurality of second connection lines 273*g* can match an extension line of each of the plurality of first connection lines 273*f* For example, the other ends of the plurality of second connection lines 273*g* can face the plurality of first connection lines 273*f* with the first protection member 271 therebetween.

A compensation member 273 according to another embodiment of the present disclosure, as illustrated in FIG. 8A, can include three second connection lines 273*g*, or as illustrated in FIG. 8B, can include four second connection lines 273*g*.

Figure 8C:
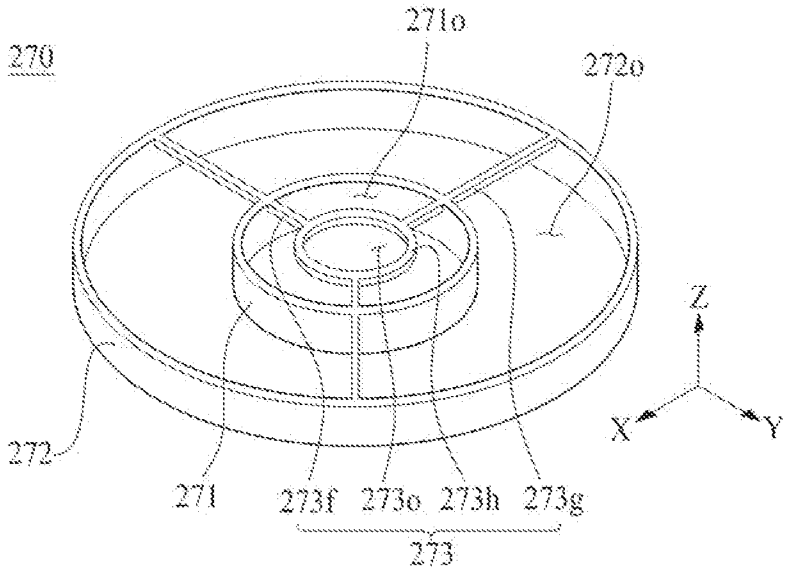
Figure 8D:
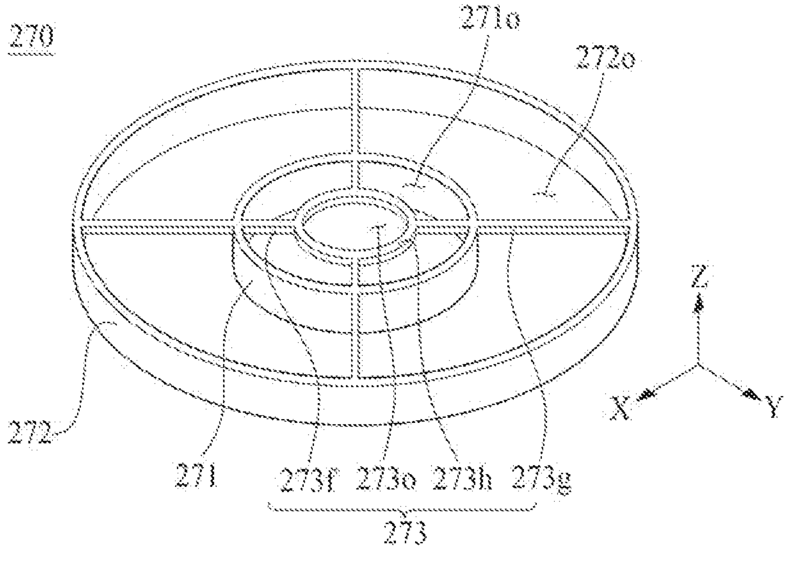

With reference to FIGS. 3, 8C, and 8D, a compensation member 273 of a protection member 270 according to another embodiment of the present disclosure can include a center member 273*h*, a plurality of first connection lines 273*f*, and a plurality of second connection lines 273*g*.

The center member 273*e* and the plurality of first connection lines 273*f* can be configured at a first protection member 271. Each of the center member 273*e* and the plurality of first connection lines 273*f* can be substantially the same as each of the center member 273*a* and the plurality of connection lines 273*b* described above with reference to FIGS. 5C and 5D, and thus, repeated descriptions thereof are omitted or may be briefly provided.

The plurality of second connection lines 273*g* can be disposed (or configured) between the first protection member 271 and the second protection member 272. The plurality of second connection lines 273*g* can be substantially the same as each of the plurality of connection lines 273*d* described above with reference to FIGS. 7A and 7B, and thus, repeated descriptions thereof are omitted or may be briefly provided.

The plurality of second connection lines 273*g* can be disposed on the same line as the plurality of first connection lines 273*f*. For example, an extension line of each of the plurality of second connection lines 273*g* can match an extension line of each of the plurality of first connection lines 273*f* For example, the other ends of the plurality of second connection lines 273*g* can face the plurality of first connection lines 273*f* with the first protection member 271 therebetween.

A compensation member 273 according to another embodiment of the present disclosure, as illustrated in FIG. 8C, can include three second connection lines 273*g*, or as illustrated in FIG. 8D, can include four second connection lines 273*g*.

Because the compensation member 273 according to another embodiment of the present disclosure includes the center member 273*h*, the plurality of first connection lines 273*f*, and the plurality of second connection lines 273*g*, an eccentric vibration of the first and second protection members 271 and 272 and/or first and second bobbins 241 and 242 can be prevented or minimized while minimizing an increase in weight of the first and second protection members 271 and 272 and/or first and second bobbins 241 and 242, and the eccentric vibration of the first and second protection members 271 and 272 and/or first and second bobbins 241 and 242 can be prevented or minimized without hindering a heat dissipation path through which heat occurring in a vibration apparatus 200 or a coil 250 is transferred to a heat dissipation member 150.

Figure 9A:
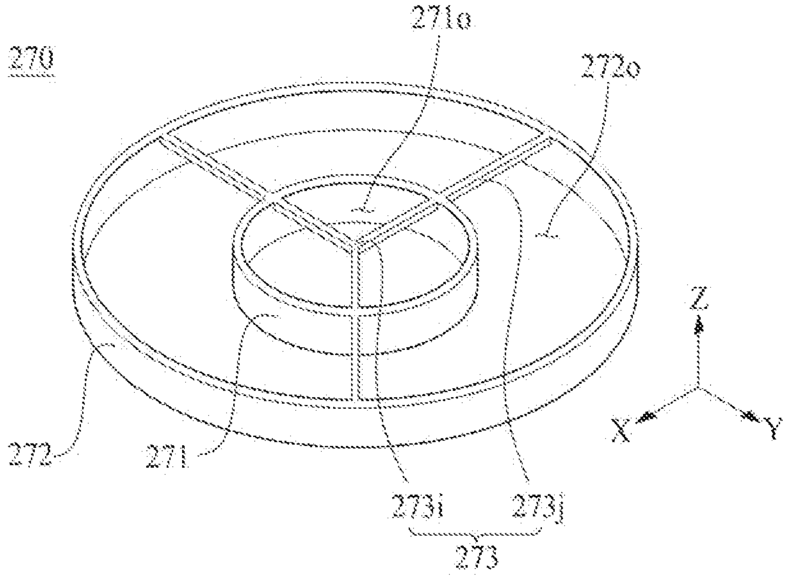
FIGS. 9A to 9C are diagrams illustrating a protection member according to another embodiment of the present disclosure.
Figure 9B:
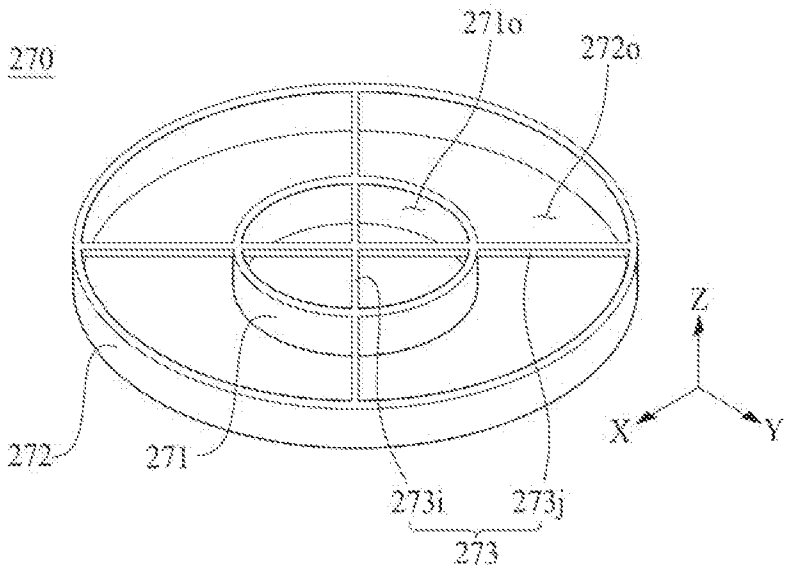
Figure 9C:
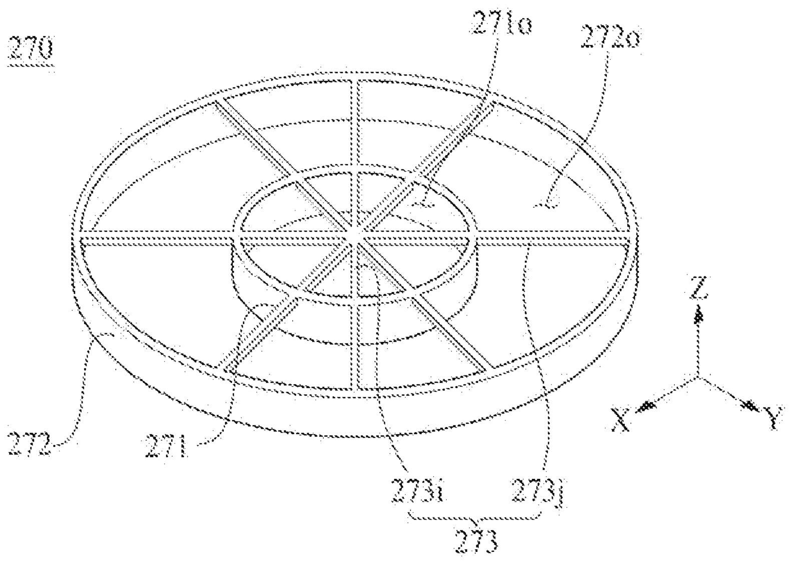

FIGS. 9A to 9C are diagrams illustrating a protection member according to another embodiment of the present disclosure. Particularly, FIGS. 9A to 9C illustrate an embodiment where a compensation member described above with reference to FIGS. 7A to 7C is additionally configured at the protection member illustrated in FIGS. 6A to 6C. In the following description, therefore, the other elements except the compensation member and relevant elements are referred to like reference numerals and repeated descriptions thereof are omitted or may be briefly provided.

With reference to FIGS. 3 and 9A to 9C, a compensation member 273 of a protection member 270 according to another embodiment of the present disclosure can include a plurality of first connection lines 273*i* and a plurality of second connection lines 273*j*.

The plurality of first connection lines 273*i* can be configured at a first protection member 271. Each of the plurality of first connection lines 273*i* can be substantially the same as each of the plurality of connection lines 273*b* described above with reference to FIGS. 6A to 6C, and thus, repeated descriptions thereof are omitted or may be briefly provided.

The plurality of second connection lines 273*j* can be disposed (or configured) between the first protection member 271 and a second protection member 272. The plurality of second connection lines 273*j* can be substantially the same as each of the plurality of connection lines 273*d* described above with reference to FIGS. 7A to 7C, and thus, repeated descriptions thereof are omitted or may be briefly provided.

The plurality of second connection lines 273*j* can be disposed on the same line as the plurality of first connection lines 273*i*. For example, an extension line of each of the plurality of second connection lines 273*j* can match an extension line of each of the plurality of first connection lines 273*i*. For example, the other ends of the plurality of second connection lines 273*j* can face the plurality of first connection lines 273*i* with the first protection member 271 therebetween.

A compensation member 273 according to another embodiment of the present disclosure, as illustrated in FIG. 9A, can include three second connection lines 273*j*, or as illustrated in FIG. 9B, can include four second connection lines 273*j*, or as illustrated in FIG. 9C, can include eight second connection lines 273*j*, but embodiments of the present disclosure are not limited thereto.

Because the compensation member 273 according to another embodiment of the present disclosure includes the plurality of first connection lines 273*i* and the plurality of second connection lines 273*j*, an eccentric vibration of the first and second protection members 271 and 272 and/or first and second bobbins 241 and 242 can be prevented or minimized while minimizing an increase in weight of the first and second protection members 271 and 272 and/or first and second bobbins 241 and 242, and the eccentric vibration of the first and second protection members 271 and 272 and/or first and second bobbins 241 and 242 can be prevented or minimized without hindering a heat dissipation path through which heat occurring in a vibration apparatus 200 or a coil 250 is transferred to a heat dissipation member 150.

Figure 10:
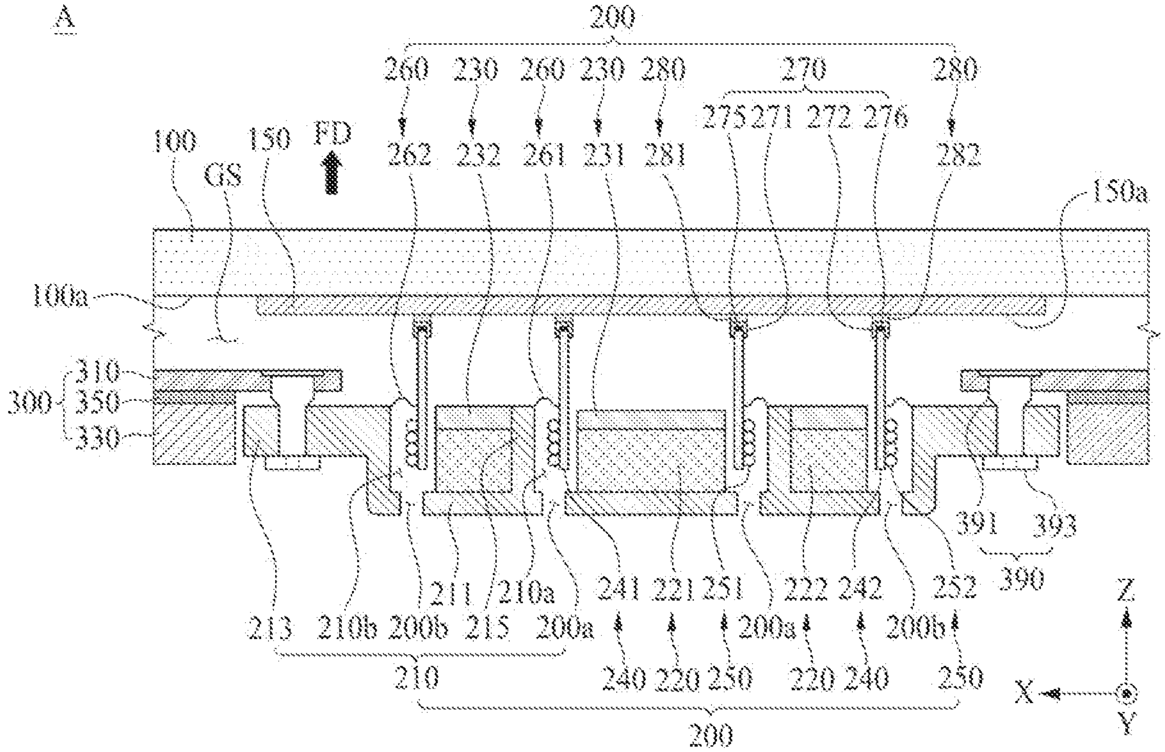
FIG. 10 is another example of an enlarged view of a region 'A' illustrated in FIG. 2.
Figure 11:
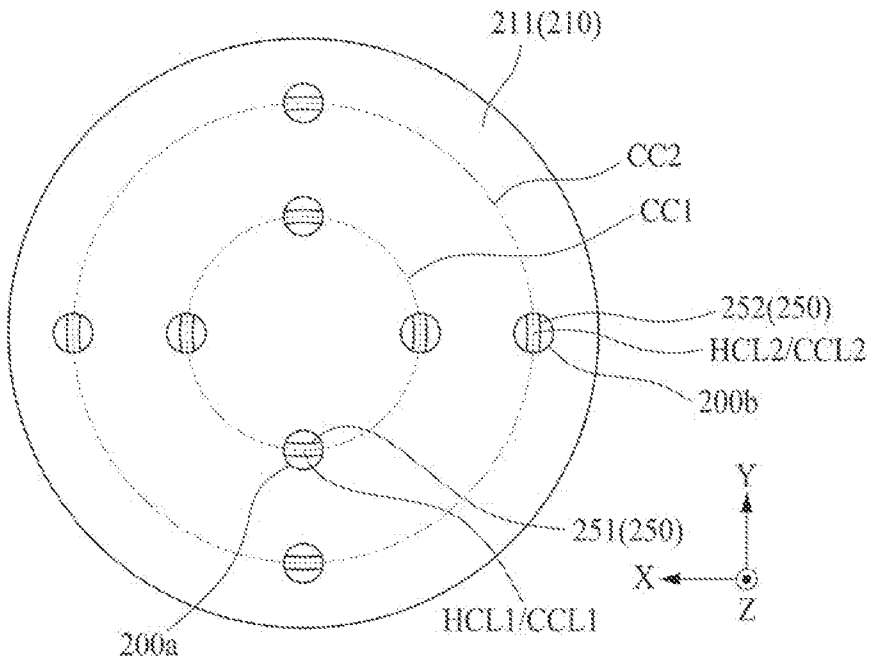
FIG. 11 is a diagram illustrating a rear surface of frame illustrated in FIG. 10.

FIG. 10 is another example of an enlarged view of a region 'A' illustrated in FIG. 2. FIG. 11 is diagram illustrating a rear surface of frame illustrated in FIG. 10. Particularly, FIGS. 10 and 11 illustrate an embodiment where one or more holes are additionally configured at the vibration apparatus described above with reference to FIGS. 1 to 9C. In the following description, therefore, the other elements except one or more holes and relevant elements are referred to like reference numerals and repeated descriptions thereof are omitted or may be briefly provided.

With reference to FIGS. 10 and 11, an apparatus or a vibration apparatus 200 according to another embodiment of the present disclosure can further include one or more holes 200*a* and 200*b*.

The one or more holes 200*a* and 200*b* can connect or communicate accommodating spaces 210*a* and 210*b* of the vibration apparatus 200 with the outside of the vibration apparatus 200. For example, the one or more holes 200*a* and 200*b* can perform a function a heat discharge path through which heat occurring due to driving of the vibration apparatus 200 is discharged to the outside of a rear surface of an apparatus, a function of increasing a sound pressure level based on driving of the vibration apparatus 200, and a function of decreasing a weight of the vibration apparatus 200. Further, when a peripheral space GS (or a vibration space) of the vibration apparatus 200 is closed, a sound pressure level generated based on driving of the vibration apparatus 200 can be insufficient due to a limited closed space, but the vibration space can be connected to the outside by the one or more holes 200*a* and 200*b*, thereby increasing a sound pressure level generated in the vibration space based on driving of the vibration apparatus 200. For example, the one or more holes 200*a* and 200*b* can be a vent hole or a penetration hole (or a communication hole).

The one or more holes 200*a* and 200*b* can be configured at a frame 210 of the vibration apparatus 200. For example, the one or more holes 200*a* and 200*b* can be configured at a first frame portion 211 of the frame 210. For example, the one or more holes 200*a* and 200*b* can be configured at the frame 210 to overlap one or more of a first coil 251 and a second coil 252. For example, the one or more holes 200*a* and 200*b* can be configured to vertically pass through the first frame portion 211 along a thickness direction Z of the vibration apparatus 200.

The one or more holes 200*a* and 200*b* according to an embodiment of the present disclosure can include one or more first holes 200*a*.

The one or more first holes 200*a* can be configured to connect or communicate a first accommodating space 210*a* of the vibration apparatus 200 or the frame 210 with the outside of the vibration apparatus 200. For example, the one or more first holes 200*a* can be configured to vertically pass through a bottom portion of a first frame portion 211. Accordingly, the first accommodating space 210*a* of the vibration apparatus 200 or the frame 210 can be connected to or communicate with the outside of the vibration apparatus 200 or the outside of a supporting member 300 through the one or more first holes 200*a*. The one or more first holes 200*a* can include one of a circular shape, an oval shape, and a slit shape, but embodiments of the present disclosure are not limited thereto.

The one or more first holes 200*a* can be configured to overlap a first bobbin 241 of a bobbin 240 and a first coil 251 of a coil 250. A central line HCL1 of the one or more first holes 200*a* can be configured to overlap the first coil 251. For example, the center line HCL1 of the one or more first holes 200*a* can overlap a center line CCL1 of the first coil 251. A diameter of each of the one or more first holes 200*a* can be greater than that of the first coil 251. Accordingly, heat occurring in the first coil 251 can be more quickly dissipated to the outside through the one or more first holes 200*a*.

The apparatus or the vibration apparatus 200 according to another embodiment of the present disclosure can include a plurality of first holes 200*a*. The plurality of first holes 200*a* can be disposed to be spaced apart from one another based on a winding shape of the first coil 251. For example, a center portion of each of the plurality of first holes 200*a* can be disposed to be spaced apart from one another on a circumference of a concentric circle CC1 corresponding to a winding shape of the first coil 251, with respect to a center point of the first coil 251.

The one or more holes 200*a* and 200*b* according to an embodiment of the present disclosure can include one or more second holes 200*b*.

The one or more second holes 200*b* can be configured to connect or communicate a second accommodating space 210*b* of the vibration apparatus 200 or the frame 210 with the outside of the vibration apparatus 200. For example, the one or more second holes 200*b* can be configured to vertically pass through a bottom portion of the first frame portion 211. Accordingly, the second accommodating space 210*b* of the vibration apparatus 200 or the frame 210 can be connected to or communicate with the outside of the vibration apparatus 200 or the outside of a supporting member 300 through the one or more second holes 200*b*. The one or more second holes 200*b* can include one of a circular shape, an oval shape, and a slit shape, but embodiments of the present disclosure are not limited thereto.

The one or more second holes 200*b* can be configured to overlap a second bobbin 242 of the bobbin 240 and a second coil 252 of the coil 250. A central line HCL2 of the one or more second holes 200*b* can be configured to overlap the second coil 252. For example, the center line HCL2 of the one or more second holes 200*b* can overlap a center line CCL2 of the second coil 251. A diameter of each of the one or more second holes 200*b* can be greater than that of the second coil 252. Accordingly, heat occurring in the second coil 252 can be more quickly dissipated to the outside through the one or more second holes 200*b*.

The apparatus or the vibration apparatus 200 according to another embodiment of the present disclosure can include a plurality of second holes 200*b*. The plurality of second holes 200*b* can be disposed to be spaced apart from one another based on a winding shape of the second coil 252. For example, a center portion of each of the plurality of second holes 200*b* can be disposed to be spaced apart from one another on a circumference of a concentric circle CC2 corresponding to a winding shape of the second coil 252, with respect to a center point of the second coil 252.

The apparatus according to another embodiment of the present disclosure can have the same effect as that of the apparatus described above with reference to FIGS. 1 to 9C. Further, because the apparatus according to another embodiment of the present disclosure further includes the one or more holes 200*a* and 200*b* provided in the frame 210 of the vibration apparatus 200, heat occurring in the vibration apparatus 200 can be dissipated to the outside, and a sound pressure level generated in a vibration space based on driving of the vibration apparatus 200 can increase.

Figure 12:
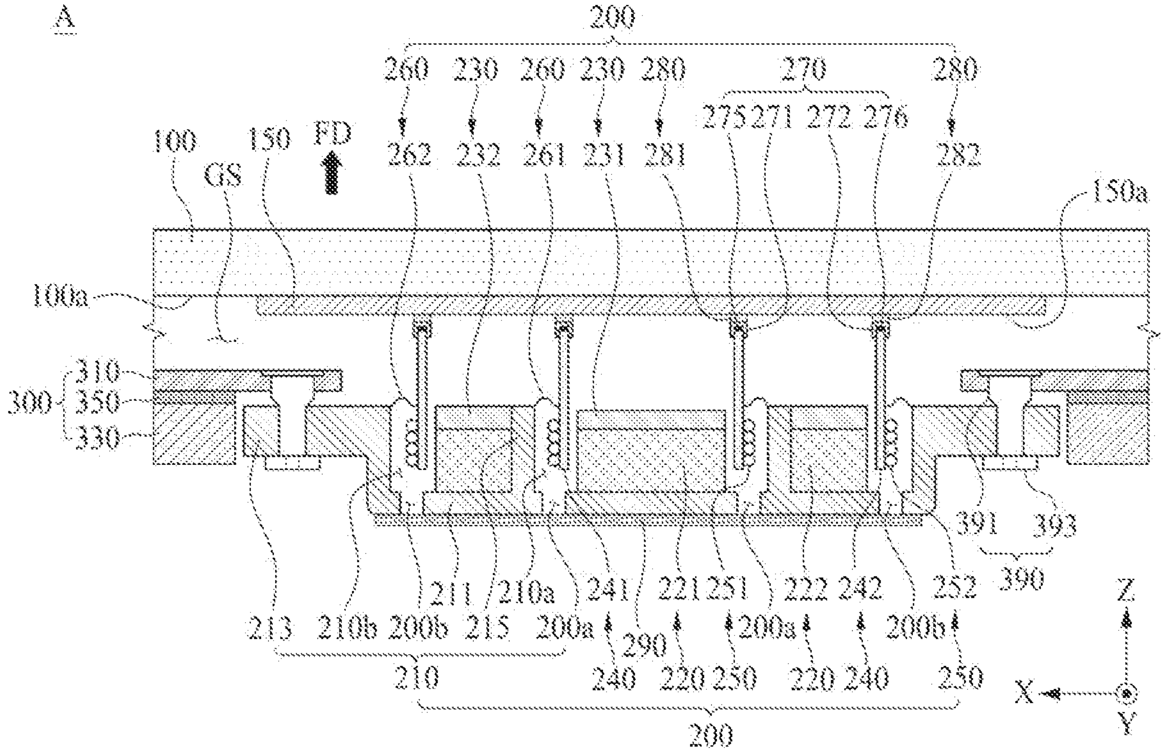
FIG. 12 is another example of an enlarged view of a region 'A' illustrated in FIG. 2.

FIG. 12 is another example of an enlarged view of a region 'A' illustrated in FIG. 2. Particularly, FIG. 12 illustrates an embodiment where a filter member is additionally provided in the vibration apparatus described above with reference to FIGS. 10 and 11. In the following description, therefore, the other elements except the filter member and relevant elements are referred to like reference numerals and repeated descriptions thereof are omitted or may be briefly provided.

With reference to FIG. 12, an apparatus or a vibration apparatus 200 according to another embodiment of the present disclosure can further include a filter member 290.

The filter member 290 can be configured to prevent particles such as dusts from penetrating into the vibration apparatus 200 from the outside of the apparatus, thereby minimizing a reduction in reliability of the vibration apparatus 200.

The filter member 290 can be configured or disposed to cover one or more holes 200*a* and 200*b* provided in the vibration apparatus 200. For example, the filter member 290 can be disposed or configured at a rear surface of a frame 210 of the vibration apparatus 200 to cover the one or more holes 200*a* and 200*b*. For example, the filter member 290 can be disposed or configured at a rear surface of a first frame portion 211 of the frame 210 to cover the one or more holes 200*a* and 200*b*.

The filter member 290 can be configured or disposed to cover one or more first holes 200*a* and one or more second holes 200*b* configured at the vibration apparatus 200. For example, the filter member 290 can be disposed or configured at the rear surface of the frame 210 of the vibration apparatus 200 to cover one or more first holes 200*a* and one or more second holes 200*b*. For example, the filter member 290 can be disposed or configured at the rear surface of the first frame portion 211 of the frame 210 to cover one or more first holes 200*a* and one or more second holes 200*b*.

The filter member 290 can be configured to cover the one or more holes 200*a* and 200*b*, and thus, can prevent particles such as dusts from penetrating into the vibration apparatus 200 through the one or more holes 200*a* and 200*b* from the outside of the apparatus.

The filter member 290 can include a mesh structure for filtering out or blocking particles such as dusts.

The filter member 290 according to an embodiment of the present disclosure can include a metal material including an iron (Fe) component. Therefore, because the filter member 290 includes the Fe component, the filter member 290 can be attached on or supported by a rear surface of the frame 210 by using a magnet 220 of the vibration apparatus 200 without a separate adhesive member. For example, the filter member 290 can be attachably/detachably fixed to or supported by a rear surface of the frame 210 with a magnetic force of the magnet 220, and thus, an operation of replacing and cleaning the filter member 290 can be easily performed.

The filter member 290 according to an embodiment of the present disclosure can be made of a non-metallic material such as a nonwoven fabric, fiber, cloth, or plastic or the like. The non-metallic filter member 290 can be attached to the rear surface of the frame 210 by an adhesive member.

The apparatus according to another embodiment of the present disclosure can have the same effect as that of the apparatus described above with reference to FIGS. 1 to 11. Further, the apparatus according to another embodiment of the present disclosure can further include the filter member 290 which covers the one or more holes 200*a* and 200*b* configured at the frame 210 of the vibration apparatus 200, and thus, can prevent particles such as dusts from penetrating into the vibration apparatus 200 through the one or more holes 200*a* and 200*b* from the outside of the apparatus.

Figure 13:
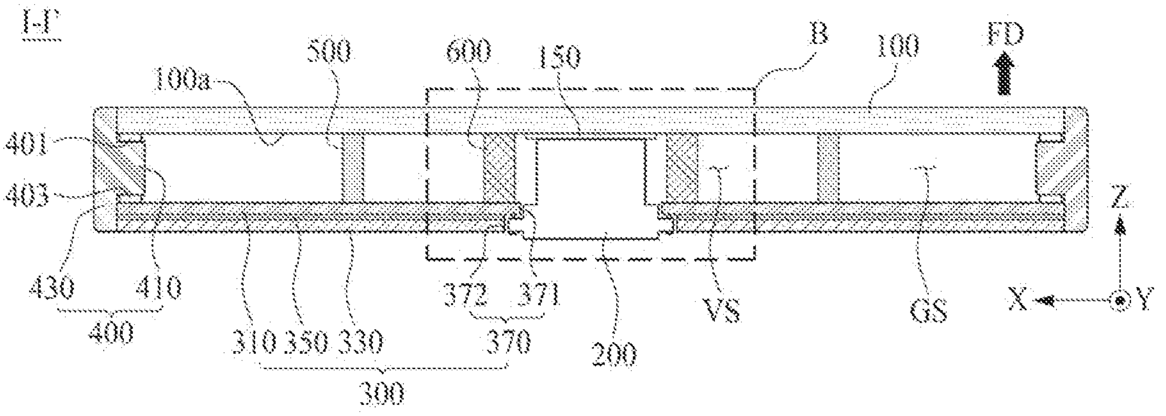
FIG. 13 is another example of a cross-sectional view taken along line I-I' illustrated in FIG. 1.
Figure 14:
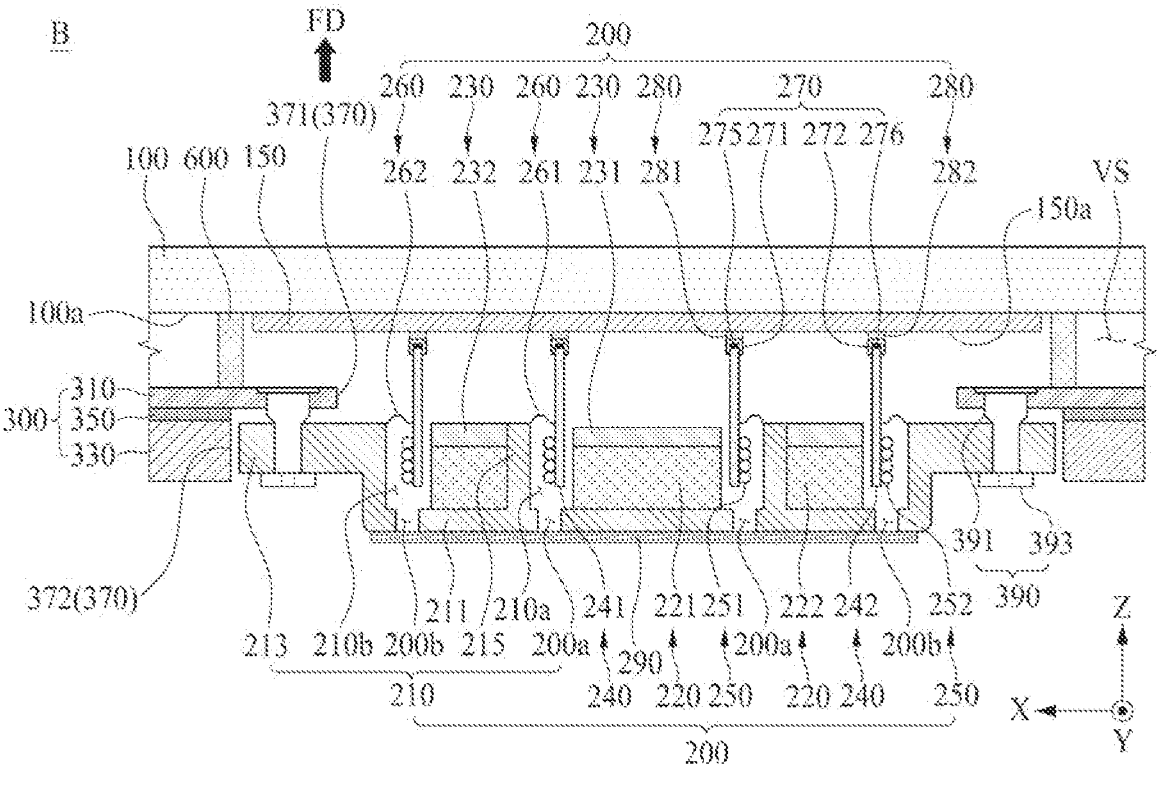
FIG. 14 is an enlarged view of a region 'B' illustrated in FIG. 13.

FIG. 13 is another example of a cross-sectional view taken along line I-I' illustrated in FIG. 1. FIG. 14 is an enlarged view of a region 'B' illustrated in FIG. 13. Particularly, FIGS. 13 and 14 are diagrams illustrating an apparatus according to another embodiment of the present disclosure.

With reference to FIG. 12, an apparatus according to another embodiment of the present disclosure can include a vibration member 100, a vibration apparatus 200, a supporting member 300, a middle frame 400, and a partition 500.

The vibration member 100, the supporting member 300, and the middle frame 400 can be substantially the same as the vibration member 100, the supporting member 300, and the middle frame 400 described above with reference to FIGS. 1 to 3, and thus, like reference numerals refer to like elements and repeated descriptions thereof are omitted or may be briefly provided.

The vibration apparatus 200 can be substantially the same as the vibration apparatus 200 described above with reference to FIGS. 1 to 12, and thus, like reference numerals refer to like elements and repeated descriptions thereof are omitted or may be briefly provided.

The partition 500 can provide or define a vibration space (or a sound pressure space) VS which generates a sound when the vibration member 100 is vibrated by the vibration apparatus 200. The partition 500 can separate the sound generated by the vibration member 100, or can separate a channel, and thus, can prevent or decrease interference of the sound. The partition 500 can be referred to as an enclosure or a baffle, but the terms are not limited thereto.

The partition 500 can divide or provide the vibration space (or a sound pressure space) VS corresponding to one vibration apparatus 200. For example, the partition 500 can be configured to surround a periphery of one vibration apparatus 200. For example, the partition 500 configured in a circular shape, an oval shape, or a tetragonal shape to surround the vibration device 200.

As an embodiment of the present disclosure, the partition 500 can be configured in a structure which seals a gap space GS between a vibration member 100 and a supporting member 300 at the periphery of the vibration apparatus 200. As another embodiment of the present disclosure, the partition 500 can be attached on (or coupled to) one of the vibration member 100 and the supporting member 300 at the periphery of the vibration apparatus 200, and moreover, may not be attached on (or coupled to) and simply contact the other of the vibration member 100 and the supporting member 300. As another embodiment of the present disclosure, the partition 500 can be configured in a structure where a portion thereof is opened, and thus, can be provided in a structure which does not completely seal the gap space GS between the vibration member 100 and the supporting member 300 at the periphery of the vibration apparatus 200.

According to an embodiment of the present disclosure, a distance between the partition 500 and the vibration apparatus 200 can be set based on a sound characteristic and/or a sound pressure level characteristic of a vibration (or a sound) generated from a vibration of the vibration member 100 based on a vibration of the vibration apparatus 200. For example, the distance between the partition 500 and the vibration apparatus 200 can be 2 to 6 times a longest length of the vibration apparatus 200, but embodiments of the present disclosure are not limited thereto.

A vibration space VS provided or divided at a peripheral region of the vibration apparatus 200 by the partition 500, the vibration member 100, and the supporting member 300 can be connected to or communicate with the outside of a rear surface of the apparatus through the holes 200*a* and 200*b* configured at the vibration apparatus 200 and through holes 371 and 372 of the supporting member 300. For example, because the vibration space VS is connected to or communicates with the outside of the rear surface of the apparatus through the through holes 371 and 372 and the holes 200*a* and 200*b*, an air pressure of the vibration space VS can be reduced, and thus, an air impedance of the vibration space VS can decrease, thereby improving a sound characteristic and/or a sound pressure characteristic of the low-pitched sound band based on a vibration of the vibration apparatus 200.

According to an embodiment of the present disclosure, the partition 500 can be configured as a material for adsorbing a vibration or adjusting a vibration. The partition 500 can include a single-sided tape, a single-sided foam tape, a single-sided foam pad, a double-sided tape, a double-sided foam pad, a double-sided foam tape, or the like, but embodiments of the present disclosure are not limited thereto. For example, the partition 500 can include one or more of a silicone-based polymer, paraffin wax, a urethane-based polymer, and an acrylic-based polymer. For example, the partition 500 can include a urethane-based material (or substance) having a relatively ductile characteristic compared to acrylic of acrylic and urethane, in order to minimize the transfer of a vibration of the vibration member 100 to the supporting member 300.

The apparatus according to another embodiment of the present disclosure can further include one or more pads 600.

The one or more pads 600 can be configured at the peripheral region of the vibration apparatus 200 to minimize or prevent an eccentric vibration of the vibration member 100 caused by a vibration of the vibration apparatus 200. For example, when the vibration apparatus 200 is vibrating based on the low-pitched sound band, an eccentric vibration can occur in the vibration member 100, and due to this, a sound characteristic and/or a sound pressure characteristic of the low-pitched sound band can be reduced. Accordingly, the one or more pads 600 can be configured at the peripheral region of the vibration apparatus 200 to minimize or prevent the eccentric vibration of the vibration member 100 occurring in the low-pitched sound band.

The one or more pads 600 can be configured at a region between the vibration member 100 and the supporting member 300 of the peripheral region of the vibration apparatus 200. For example, the one or more pads 600 can be configured at a region between the supporting member 300 and the vibration member 100 adjacent to the vibration apparatus 200.

The one or more pad members 600 can include a material for adsorbing a vibration or adjusting a vibration. For example, the one or more pad members 600 can include a single-sided tape, a single-sided foam tape, a single-sided foam pad, a double-sided tape, a double-sided foam pad, a double-sided foam tape, or the like, but embodiments of the present disclosure are not limited thereto. For example, the one or more pad members 600 can include one or more of a silicone-based polymer, paraffin wax, a urethane-based polymer, and an acrylic-based polymer. For example, the one or more pad members 600 can be configured as a material which differs from the partition 500 of the silicone-based polymer, the paraffin wax, the urethane-based polymer, and the acrylic-based polymer, but embodiments of the present disclosure are not limited thereto. For example, the one or more pad members 600 can include a urethane-based material (or substance) having a relatively ductile characteristic compared to acrylic of acrylic and urethane, so as to minimize the transfer of a vibration of the vibration member 100 to the supporting member 300. For example, the one or more pads 600 can include a material which is more ductile than that of the partition 500.

The one or more pads 600 according to an embodiment of the present disclosure can be configured to minimize or prevent an eccentric vibration occurring in the vibration member 100 when the vibration apparatus 200 is vibrating based on the low-pitched sound band, thereby enhancing a sound characteristic and/or a sound pressure characteristic of the low-pitched sound band. The one or more pads 600 can be an eccentric vibration prevention member, an eccentric vibration reduction member, or an eccentric vibration prevention pad, but embodiments of the present disclosure are not limited thereto.

According to another embodiment of the present disclosure, the one or more pads 600 can be disposed or provided at an optimal position which is previously obtained by using a laser Doppler device. Laser Doppler can irradiate a laser beam onto a negative vibration surface of the vibration member 100 and can check a scattered pattern to determine a vibration spread pattern. Therefore, one or more eccentric vibration positions corresponding to the vibration member 100 can be determined or obtained. Accordingly, the one or more pads 600 can be disposed or provided at one or more eccentric vibration positions of the vibration member 100, and thus, can minimize or prevent an eccentric vibration occurring in the vibration member 100 when the vibration apparatus 200 is vibrating based on the low-pitched sound band.

The apparatus according to another embodiment of the present disclosure can have the same effect as that of the apparatus described above with reference to FIGS. 1 to 12. Further, because the apparatus according to another embodiment of the present disclosure further includes the partition 500 surrounding the vibration apparatus 200, a sound characteristic and/or a sound pressure characteristic of the low-pitched sound band based on a vibration of the vibration apparatus 200 can be improved. Moreover, because the apparatus according to another embodiment of the present disclosure further includes the one or more pads 600 provided in the peripheral region of the vibration apparatus 200, an eccentric vibration occurring in the vibration member 100 when the vibration apparatus 200 is vibrating based on the low-pitched sound band can be prevented or minimized, and thus, a sound characteristic and/or a sound pressure characteristic of the low-pitched sound band can be more improved.

Figure 15:
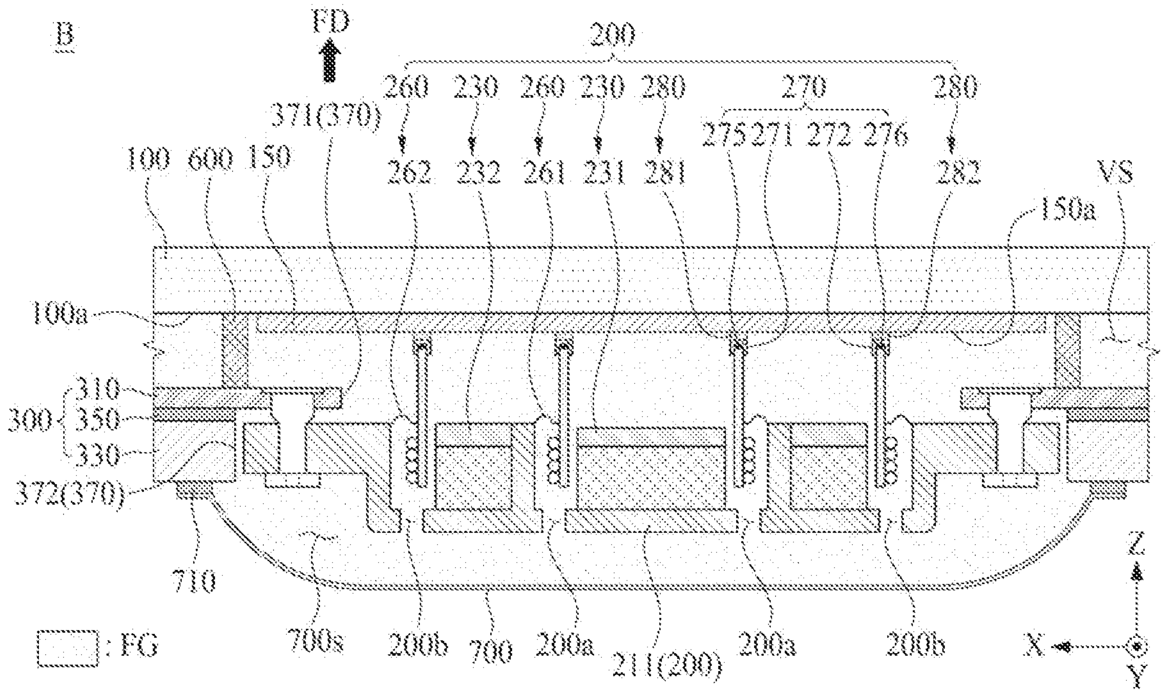
FIG. 15 is another example of an enlarged view of a region 'B' illustrated in FIG. 13.

FIG. 15 is another example of an enlarged view of a region ‘B’ illustrated in FIG. 13. Particularly, FIG. 15 illustrates an embodiment where an enclosure is additionally provided in the apparatus described above with reference to FIGS. 13 and 14. In the following description, therefore, the other elements except the enclosure and relevant elements are referred to like reference numerals and repeated descriptions thereof are omitted or may be briefly provided.

With reference to FIGS. 13 and 15, an apparatus according to another embodiment of the present disclosure can further include an enclosure 700.

The enclosure 700 can be configured to cover a rear surface of the vibration apparatus 200. For example, the enclosure 700 can be configured to surround the rear surface of the vibration apparatus 200. For example, the enclosure 700 can be configured to surround a lower portion of the vibration apparatus 200. For example, the enclosure 700 can be configured to seal (or close) a peripheral space of a vibration apparatus 200.

According to another embodiment of the present disclosure, the enclosure 700 can be configured at the supporting member 300 to surround the rear surface of the vibration apparatus 200. For example, the enclosure 700 can be configured at a rear surface of the supporting member 300 to surround the rear surface of the vibration apparatus 200. For example, the enclosure 700 can be configured to seal (or close) a vibration space VS of the vibration apparatus 200. For example, the enclosure 700 can be configured to seal (or close) holes **200*a* and 200*b* configured at the vibration apparatus 200 and through holes 371 and 372 of the supporting member 300 connected to or communicated with the vibration space VS of the vibration apparatus 200**.

The enclosure 700 can include a material capable of contraction and/or expansion. The enclosure 700 can include a soft rubber material or a soft silicon material, but embodiments of the present disclosure are not limited thereto.

According to another embodiment of the present disclosure, the enclosure 700 can seal (or close) the holes **200*a* and 200*b* configured at the vibration apparatus 200 and the through holes 371 and 372 of the supporting member 300 connected to or communicated with the vibration space VS of the vibration apparatus 200, and thus, air flow between the vibration space VS and an external space of the apparatus can be blocked. For example, the enclosure 700 can form a seal space 700*s* at the rear of the vibration device 200**.

The seal space **700*s* can be spatially separated (or isolated) from the external space (or a rear space) of the apparatus by the enclosure 700 and can be connected or communicated with the vibration space VS of the vibration apparatus 200 through the holes 200*a* and 200*b* configured at the vibration apparatus 200 and the through holes 371 and 372 of the supporting member 300. Therefore, the vibration space VS and the seal space 700*s* can have the same atmosphere. For example, the vibration space VS and the seal space 700***s* can have the same air atmosphere. For example, the vibration space VS and the seal space 700*s* surrounded by the vibration member 100, the supporting member 300, the partition 500, and the enclosure 700 can be a peripheral seal space of the vibration apparatus 200 or an internal space of the enclosure 700. In the following description, the vibration space VS and the seal space 700*s* can be referred to as "an internal space (VS, 700*s*) of the enclosure 700".

The enclosure 700 can be connected to (or coupled to) the rear surface of the supporting member 300 spaced apart from the rear surface of the vibration apparatus 200 by a gasket 710. For example, an edge portion of the enclosure 700 can be connected (or coupled) to a rearmost surface of the supporting member 300 by the gasket 710. For example, the gasket 710 can be disposed or interposed at a region between the edge portion of the enclosure 700 and the rear surface of the supporting member 300 at a periphery of a second through hole 372 of the supporting member 300.

According to an embodiment of the present disclosure, the gasket 710 can include a material capable of compression or contraction. The internal space (VS, 700*s*) of the enclosure 700 can have a gas atmosphere, based on a gas injected through a nozzle member such as a gas injection needle or the like inserted in the seal space 700*s* through the gasket 710. A portion, where a nozzle member is not provided (or missing), of the gasket 710 can be autonomously sealed (or closed) by a compression force or a contraction force of the gasket 710.

According to another embodiment of the present disclosure, the gasket 710 can be configured to include a nozzle device including a gas injection port and a gas discharge port, but embodiments of the present disclosure are not limited thereto. For example, the internal space (VS, 700*s*) of the enclosure 700 can have a gas atmosphere by a gas injected through the nozzle device configured at the gasket 710.

The internal space (VS, 700*s*) of the enclosure 700 can have an air atmosphere or a gas atmosphere. For example, the internal space (VS, 700*s*) of the enclosure 700 can increase in volume as an injected gas is filled therein. For example, a volume of the internal space (VS, 700*s*) of the enclosure 700 can increase by a volume of the injected gas. For example, a filling gas FG filled into the internal space (VS, 700*s*) of the enclosure 700 can be a gas for reducing an air impedance of the internal space (VS, 700*s*) of the enclosure 700. Accordingly, a sound characteristic and/or a sound pressure characteristic of the low-pitched sound band generated based on a vibration of the vibration apparatus 200 can be improved.

According to an embodiment of the present disclosure, the filling gas FG can be a gas which is high in compression rate and expansion rate. For example, the filling gas FG can be an inert gas. For example, the filling gas FG can include He, Ne, Ar, Kr, Xe, and Rn, but embodiments of the present disclosure are not limited thereto.

The apparatus according to another embodiment of the present disclosure can have the same effect as that of the apparatus described above with reference to FIGS. 1 to 12. Further, because the apparatus according to another embodiment of the present disclosure further includes the enclosure 700 surrounding the rear surface of the vibration apparatus 200, an air impedance of the vibration space VS of the vibration apparatus 200 can be reduced, and thus, a sound characteristic and/or a sound pressure characteristic of the low-pitched sound band generated based on a vibration of the vibration apparatus 200 can be improved. Moreover, in the apparatus according to another embodiment of the present disclosure, an air impedance of the vibration space VS of the vibration apparatus 200 can be reduced by the filling gas FG filled into the internal space (VS, 700*s*) of the enclosure 700 including the vibration space VS of the vibration apparatus 200, and thus, a sound characteristic and/or a sound pressure characteristic of the low-pitched sound band generated based on a vibration of the vibration apparatus 200 can be improved.

Figure 16:
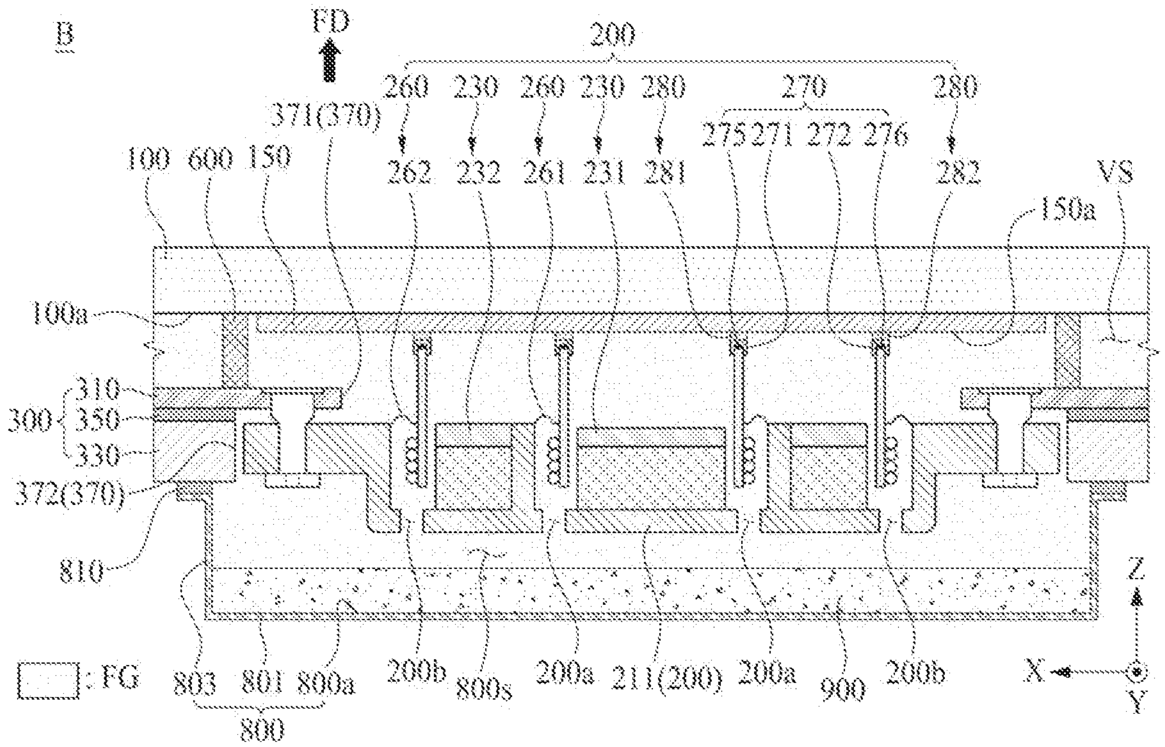
FIG. 16 is another example of an enlarged view of a region 'B' illustrated in FIG. 13.

FIG. 16 is another example of an enlarged view of a region 'B' illustrated in FIG. 13. Particularly, FIG. 16 illustrates an embodiment implemented by modifying the enclosure described above with reference to FIG. 15. In the following description, therefore, the other elements except the enclosure and relevant elements are referred to like reference numerals and repeated descriptions thereof are omitted or may be briefly provided.

With reference to FIGS. 13 and 15, An enclosure 800 according to another embodiment of the present disclosure can include one or more material of a metal material or a nonmetal material (or a composite nonmetal material). For example, the enclosure 800 can include one or more material of metal, plastic, and wood, but embodiments of the present disclosure are not limited thereto. For example, the enclosure 800 can be configured as a metal material such as aluminum (Al) or a plastic material such as plastic or styrene material, but embodiments of the present disclosure are not limited thereto. For example, the styrene material can be an ABS material. The ABS material can be acrylonitrile, butadiene, and styrene.

The enclosure 800 can be configured to cover a rear surface of the vibration apparatus 200. For example, the enclosure 800 can be configured to surround the rear surface of the vibration apparatus 200. For example, the enclosure 800 can be configured to surround a lower portion of the vibration apparatus 200. For example, the enclosure 800 can be configured to seal (or close) a peripheral space of a vibration apparatus 200.

According to another embodiment of the present disclosure, the enclosure 800 can be configured at the supporting member 300 to surround the rear surface of the vibration apparatus 200. For example, the enclosure 800 can be configured at a rear surface of the supporting member 300 to surround the rear surface of the vibration apparatus 200. For example, the enclosure 800 can be configured to seal (or close) a vibration space VS of the vibration apparatus 200. For example, the enclosure 800 can be configured to seal (or close) holes 200*a* and 200*b* configured at the vibration apparatus 200 and through holes 371 and 372 of the supporting member 300 connected to or communicated with the vibration space VS of the vibration apparatus 200.

The enclosure 800 according to another embodiment of the present disclosure can include a rear portion 801 and a lateral portion 803.

The rear portion 801 can be configured to cover the rear surface of the vibration apparatus 200. The rear portion 801 can have a size which is greater than that of a rear surface of a vibration apparatus 200, so as to cover a whole rear surface of the vibration apparatus 200 and a portion of a rear surface of a supporting member 300 adjacent to the vibration apparatus 200.

The lateral portion 803 can be configured to be connected to an edge portion of the rear portion 801. For example, the lateral portion 803 can be bent toward a rear surface of the supporting member 300 from the edge portion of the rear portion 801. Accordingly, the enclosure 800 can include a seal space **800*s* which is defined or divided by the rear portion 801 and the lateral portion 803. For example, the enclosure 800 can include a box structure where an upper portion (or an upper surface) of the seal space 800*s*** is opened.

The seal space **800*s* of the enclosure 800 can be spatially separated (or isolated) from the external space (or a rear space) of the apparatus and can be connected or communicated with the vibration space VS of the vibration apparatus 200 through the holes 200*a* and 200*b* configured at the vibration apparatus 200 and the through holes 371 and 372 of the supporting member 300. Therefore, the vibration space VS and the seal space 800*s* can have the same atmosphere. For example, the vibration space VS and the seal space 800*s* can have the same air atmosphere. For example, the vibration space VS and the seal space 800*s* surrounded by the vibration member 100, the supporting member 300, the partition 500, and the enclosure 800 can be a peripheral seal space of the vibration apparatus 200 or an internal space of the enclosure 800. In the following description, the vibration space VS and the seal space 800*s* can be referred to as "an internal space (VS, 800*s*) of the enclosure 700**".

The enclosure 800 can be connected to (or coupled to) the rear surface of the supporting member 300 spaced apart from the rear surface of the vibration apparatus 200 by a gasket 810. For example, an edge portion of the enclosure 800 can be connected (or coupled) to a rearmost surface of the supporting member 300 by the gasket 810. For example, the gasket 810 can be disposed or interposed at a region between the edge portion of the enclosure 800 and the rear surface of the supporting member 300 at a periphery of a second through hole 372 of the supporting member 300. For example, the gasket 810 can be disposed or interposed at a region between the lateral portion 803 of the enclosure 800 and the rear surface of the supporting member 300 at a periphery of a second through hole 372 of the supporting member 300. The gasket 810 can be substantially the same as the gasket 710 described above with reference to FIG. 15, and thus, repeated descriptions thereof are omitted or may be briefly provided.

The internal space (VS, **800*s*) of the enclosure 800 can have an air atmosphere or a gas atmosphere. For example, the internal space (VS, 800*s*) of the enclosure 800 can increase in volume as an injected gas is filled therein. For example, a volume of the internal space (VS, 800*s*) of the enclosure 800 can increase by a volume of the injected gas. For example, a filling gas FG filled into the internal space (VS, 800*s*) of the enclosure 800 can be a gas for reducing an air impedance of the internal space (VS, 800*s*) of the enclosure 800. Accordingly, a sound characteristic and/or a sound pressure characteristic of the low-pitched sound band generated based on a vibration of the vibration apparatus 200** can be improved.

According to an embodiment of the present disclosure, the filling gas FG can be a gas which is high in compression rate and expansion rate. For example, the filling gas FG can be an inert gas. For example, the filling gas FG can include He, Ne, Ar, Kr, Xe, and Rn, but embodiments of the present disclosure are not limited thereto.

The apparatus according to another embodiment of the present disclosure can have the same effect as that of the apparatus described above with reference to FIGS. 1 to 15.

The apparatus according to another embodiment of the present disclosure can further include a porous member 900.

The porous member 900 can be configured to increase a capacity of the filling gas FG filled into the internal space (VS, **800*s*) of the enclosure 800. For example, the porous member 900 can be configured to increase a flow path of a gas in the internal space (VS, 800*s*) of the enclosure 800**.

The porous member 900 according to an embodiment of the present disclosure can be disposed or configured at a region between the enclosure 800 and the vibration apparatus 200. For example, the porous member 900 can be disposed or configured at the enclosure 800 so as to be spaced apart from the vibration apparatus 200. For example, the porous member 900 can be disposed or configured at a bottom surface (or an inner surface) of the enclosure 800 so as to be spaced apart from the vibration apparatus 200.

The porous member 900 can be disposed or configured at a bottom surface (or an inner surface) of the rear portion 801 of the enclosure 800 so as to be spaced apart from the vibration apparatus 200. For example, the porous member 900 can be attached on or coupled to the bottom surface (or the inner surface) of the rear portion 801 of the enclosure 800 by an adhesive member. For example, the adhesive member can be a double-sided tape, an adhesive, or a bond, but embodiments of the present disclosure are not limited thereto.

According to an embodiment of the present disclosure, the porous member 900 can have a constant thickness (or same thickness) and can be spaced apart from a rear surface (or a rearmost surface) of the vibration apparatus 200. For example, a distance (or a thickness) between the rear portion 801 of the enclosure 800 and an uppermost surface of the porous member 900 can be wholly constant (or same). For example, the uppermost surface of the porous member 900 facing the rear surface of the vibration apparatus 200 can have a planar structure, or can be a flat surface.

According to another embodiment of the present disclosure, the porous member 900 can be spaced apart from the rear surface (or the rearmost surface) of the vibration apparatus 200 and can include a shape corresponding to the rear surface of the vibration apparatus 200. For example, the uppermost surface of the porous member 900 facing the rear surface of the vibration apparatus 200 can have a non-flat or nonplanar structure which follows a shape of the rear surface of the vibration apparatus 200. Accordingly, a distance between the rear surface of the vibration apparatus 200 and the uppermost surface of the porous member 900 can be constant.

The porous member 900 according to an embodiment of the present disclosure can include a porous material including a plurality of internal voids (or pores). The porous member 900 can include a porous material having a range where a porosity rate is about 90%. For example, the porous member 900 can include one or more materials of a porous coordination polymer (PCP), a metal organic framework (MOF), zeolite, and activated carbon, but embodiments of the present disclosure are not limited thereto.

An internal space of the porous member 900 based on a plurality of internal voids in the porous member 900 can occupy a certain volume spaced apart from the vibration apparatus 200 in the seal space **800*s* of the enclosure 800. An area per unit volume contacting a gas in the seal space 800*s* of the enclosure 800 can increase due to the internal space of the porous member 900. Therefore, a flow path of a gas flowing between the plurality of internal voids can increase, and thus, a volume of the seal space 800*s* of the enclosure 800 can more increase than a real volume. Therefore, the porous member 900 can contribute to increase a gas volume of the internal space (VS, 800*s*) of the enclosure 800. Accordingly, an air impedance of the internal space (VS, 800*s*) of the enclosure 800 can be reduced, and thus, a sound characteristic and/or a sound pressure characteristic of the low-pitched sound band generated based on a vibration of the vibration apparatus 200** can be improved.

Because the apparatus according to another embodiment of the present disclosure further includes the porous member 900, a sound characteristic and/or a sound pressure characteristic of the low-pitched sound band generated based on a vibration of the vibration apparatus 200 can be more improved.

A vibration apparatus and an apparatus including the same according to one or more embodiments of the present disclosure are described below.

A vibration apparatus according to an embodiment of the present disclosure can comprise a frame including an accommodating space, a magnet accommodated into the accommodating space, the magnet including a first magnet and a second magnet at a periphery of the first magnet, a bobbin accommodated into the accommodating space, the bobbin including a first bobbin at a periphery of the first magnet and a second bobbin at a periphery of the first bobbin, a coil including a first coil at a periphery of the first bobbin and a second coil at a periphery of the second bobbin, and a protection member including a first protection member connected to the first bobbin and a second protection member connected to the second bobbin, the second protection member can be spaced apart from the first protection member.

According to one or more embodiments of the present disclosure, the second protection member can surround the first protection member and can be separated from the first protection member.

According to one or more embodiments of the present disclosure, the vibration apparatus can further comprise a compensation member configured at one or more of the first protection member and the second protection member.

According to one or more embodiments of the present disclosure, the first protection member can comprise an opening portion overlapping the first bobbin, and the compensation member can comprise a center member disposed at an opening portion of the first protection member, and a plurality of connection lines connected between the first protection member and the center member and spaced apart from one another.

According to one or more embodiments of the present disclosure, the center member can comprise a plate structure, or comprises a ring structure including a hollow portion overlapping the opening portion of the first protection member.

According to one or more embodiments of the present disclosure, the first protection member can comprise an opening portion overlapping the first bobbin, and the compensation member can comprise a plurality of connection lines configured to cross the opening portion of the first protection member and spaced apart from one another.

According to one or more embodiments of the present disclosure, one end of each of the plurality of connection lines can be connected to an inner surface of the first protection member, and the other ends of the plurality of connection lines can be connected to one another in the opening portion of the first protection member.

According to one or more embodiments of the present disclosure, the compensation member can comprise a plurality of connection lines connected between the first protection member and the second protection member and spaced apart from one another.

According to one or more embodiments of the present disclosure, the first protection member can comprise an opening portion overlapping the first bobbin, and the compensation member can comprise a center member disposed at an opening portion of the first protection member, and a plurality of connection lines connected between the first protection member and the center member.

According to one or more embodiments of the present disclosure, the center member can comprise a plate structure, or comprises a ring structure including a hollow portion overlapping the opening portion of the first protection member.

According to one or more embodiments of the present disclosure, the first protection member can comprise an opening portion overlapping the first bobbin, and the compensation member can comprise a plurality of connection lines configured to cross the opening portion of the first protection member.

According to one or more embodiments of the present disclosure, one end of each of the plurality of connection lines can be connected to an inner surface of the first protection member, and the other ends of the plurality of connection lines can be connected to one another in the opening portion of the first protection member.

According to one or more embodiments of the present disclosure, the frame can comprise a first frame portion including the accommodating space, and a second frame portion configured at at least one lateral surface of the first frame portion.

According to one or more embodiments of the present disclosure, the frame can comprise a partition wall portion dividing the accommodating space into a first accommodating space and a second accommodating space, the first magnet can be at the first accommodating space, and the second magnet can be at the second first accommodating space.

According to one or more embodiments of the present disclosure, the vibration apparatus can further comprise one or more holes configured at the frame to overlap one or more of the first coil and the second coil.

According to one or more embodiments of the present disclosure, the vibration apparatus can further comprise a filter member configured at a rear surface of the frame to cover the one or more holes.

According to one or more embodiments of the present disclosure, the filter member can be configured as a metal material containing an iron (Fe) component.

According to one or more embodiments of the present disclosure, the first protection member can surround an upper end portion of the first bobbin, and the second protection member can surround an upper end portion of the second bobbin.

According to one or more embodiments of the present disclosure, the first protection member can include a first groove accommodating an upper end portion of the first bobbin, and the second protection member can include a second groove accommodating an upper end portion of the second bobbin.

According to one or more embodiments of the present disclosure, the first protection member and the second protection member can be configured as a fiber reinforced material, a complex resin including fiber reinforced material, or metal material.

An apparatus according to one or more embodiments of the present disclosure can comprise a vibration member, a vibration apparatus connected to a rear surface of the vibration member, and a supporting member at the rear surface of the vibration member to support the vibration apparatus, the vibration apparatus can comprise a frame including an accommodating space, a magnet accommodated into the accommodating space, the magnet including a first magnet and a second magnet at a periphery of the first magnet, a bobbin accommodated into the accommodating space, the bobbin including a first bobbin at a periphery of the first magnet and a second bobbin at a periphery of the first bobbin, a coil including a first coil at a periphery of the first bobbin and a second coil at a periphery of the second bobbin, and a protection member including a first protection member connected to the first bobbin and a second protection member connected to the second bobbin, the second protection member can be spaced apart from the first protection member.

According to one or more embodiments of the present disclosure, the supporting member can comprise a first supporting member including a first hole and supporting the vibration apparatus, and a second supporting member at a rear surface of the first supporting member, the second supporting member including a second hole overlapping the first hole.

According to one or more embodiments of the present disclosure, a frame of the vibration apparatus can have a size, which is greater than a size of the first hole and smaller than a size of the second hole, and can be inserted into the second hole.

According to one or more embodiments of the present disclosure, the vibration apparatus can further comprise one or more holes configured at the frame to overlap one or more of the first coil and the second coil.

According to one or more embodiments of the present disclosure, the vibration apparatus can further comprise a filter member configured at a rear surface of the frame to cover the one or more holes.

According to one or more embodiments of the present disclosure, the apparatus can further comprise one or more pads provided between the supporting member and a rear surface of the vibration member in a peripheral region of the vibration apparatus.

According to one or more embodiments of the present disclosure, the apparatus can further comprise a partition configured between the rear surface of the vibration member and the supporting member to surround the vibration apparatus, the one or more pads can comprise a material which is more ductile than a material of the partition.

According to one or more embodiments of the present disclosure, the apparatus can further comprise an enclosure configured at a rear surface of the supporting member to cover the rear surface of the vibration apparatus.

According to one or more embodiments of the present disclosure, the apparatus can further comprise a vibration space configured at a periphery of the vibration apparatus by the partition, the vibration member, and the supporting member, and a seal space configured at the rear surface of the vibration apparatus by the enclosure, the vibration space and the seal space can be communicated through the one or more holes.

According to one or more embodiments of the present disclosure, the vibration space and the seal space can have an air atmosphere or a gas atmosphere.

According to one or more embodiments of the present disclosure, the apparatus can further comprise an inert gas filled into the vibration space and the seal space.

According to one or more embodiments of the present disclosure, the enclosure can include a soft rubber material or a soft silicon material.

According to one or more embodiments of the present disclosure, the enclosure can include a metal material or a nonmetal material.

According to one or more embodiments of the present disclosure, the apparatus can further comprise a porous member spaced apart from the vibration apparatus and configured at the enclosure to face the vibration apparatus.

According to one or more embodiments of the present disclosure, the vibration member can comprise one or more of a display panel configured to display an image, a screen panel on which an image is to be projected from a display apparatus, a light emitting diode lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

According to one or more embodiments of the present disclosure, the vibration member can comprise one or more materials of plastic, fiber, leather, wood, cloth, rubber, carbon, glass, and paper.

A vibration apparatus according to one or more embodiments of the present disclosure can be applied to or included in a vibration generating apparatus and/or a sound generating apparatus disposed in an apparatus. An apparatus according to one or more embodiments of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. Further, a vibration apparatus according to one or more embodiments of the present disclosure can be applied to or included in an organic light-emitting lighting apparatus or an inorganic light-emitting lighting apparatus. When the vibration apparatus is applied to or included in the lighting apparatuses, the lighting apparatuses can act as lighting and a speaker. In addition, when the vibration generating apparatus according to one or more embodiments of the present disclosure is applied to or included in the mobile apparatuses or the like, the vibration apparatus can be one or more of a speaker, a receiver, and a haptic device, but embodiments of the present disclosure are not limited thereto.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A vibration apparatus comprising:

a frame including an accommodating space;

a magnet accommodated into the accommodating space, the magnet including a first magnet and a second magnet at a periphery of the first magnet;

a bobbin accommodated into the accommodating space, the bobbin including a first bobbin at a periphery of the first magnet and a second bobbin at a periphery of the first bobbin;

a coil including a first coil at a periphery of the first bobbin and a second coil at a periphery of the second bobbin; and a protection member including a first protection member connected to the first bobbin and a second protection member connected to the second bobbin, wherein the second protection member is spaced apart from the first protection member, and wherein the second protection member surrounds the first protection member and is separated from the first protection member.

2. The vibration apparatus of claim 1, further comprising a compensation member configured at one or more of the first protection member and the second protection member.

3. The vibration apparatus of claim 2, wherein the first protection member comprises an opening portion overlapping the first bobbin, and wherein the compensation member comprises:

a center member disposed at an opening portion of the first protection member; and a plurality of connection lines connected between the first protection member and the center member and spaced apart from one another.

4. The vibration apparatus of claim 3, wherein the center member comprises a plate structure, or a ring structure including a hollow portion overlapping the opening portion of the first protection member.

5. The vibration apparatus of claim 2, wherein the first protection member comprises an opening portion overlapping the first bobbin, and wherein the compensation member comprises a plurality of connection lines configured to cross the opening portion of the first protection member and spaced apart from one another.

6. The vibration apparatus of claim 5, wherein one end of each of the plurality of connection lines is connected to an inner surface of the first protection member, and wherein other ends of the plurality of connection lines are connected to one another in the opening portion of the first protection member.

7. The vibration apparatus of claim 2, wherein the compensation member comprises a plurality of connection lines connected between the first protection member and the second protection member and spaced apart from one another.

8. The vibration apparatus of claim 7, wherein the first protection member comprises an opening portion overlapping the first bobbin, and wherein the compensation member further comprises:

a center member disposed at the opening portion of the first protection member; and a plurality of connection lines connected between the first protection member and the center member.

9. The vibration apparatus of claim 8, wherein the center member comprises a plate structure, or a ring structure including a hollow portion overlapping the opening portion of the first protection member.

10. The vibration apparatus of claim 7, wherein the first protection member comprises an opening portion overlapping the first bobbin, and wherein the compensation member further comprises a plurality of connection lines configured to cross the opening portion of the first protection member.

11. The vibration apparatus of claim 10, wherein one end of each of the plurality of connection lines is connected to an inner surface of the first protection member, and wherein other ends of the plurality of connection lines are connected to one another in the opening portion of the first protection member.

12. The vibration apparatus of claim 1, wherein the frame comprises:

a first frame portion including the accommodating space; and a second frame portion configured at a lateral surface of the first frame portion.

13. The vibration apparatus of claim 12, wherein the frame comprises a partition wall portion dividing the accommodating space into a first accommodating space and a second accommodating space;

wherein the first magnet is at the first accommodating space; and wherein the second magnet is at the second-first accommodating space.

14. The vibration apparatus of claim 1, further comprising one or more holes configured at the frame to overlap one or more of the first coil and the second coil.

15. The vibration apparatus of claim 14, further comprising a filter member configured at a rear surface of the frame to cover the one or more holes.

16. The vibration apparatus of claim 15, wherein the filter member includes a metal material containing an iron (Fe) component.

17. The vibration apparatus of claim 1, wherein the first protection member surrounds an upper end portion of the first bobbin, and wherein the second protection member surrounds an upper end portion of the second bobbin.

18. The vibration apparatus of claim 1, wherein the first protection member includes a first groove accommodating an upper end portion of the first bobbin, and wherein the second protection member includes a second groove accommodating an upper end portion of the second bobbin.

19. The vibration apparatus of claim 1, wherein at least one of the first protection member and the second protection member includes a fiber reinforced material, a complex resin including fiber reinforced material, or metal material.

20. An apparatus comprising:

a vibration member;

the vibration apparatus of claim 1, the vibration apparatus being connected to a rear surface of the vibration member; and a supporting member at the rear surface of the vibration member to support the vibration apparatus.

21. The apparatus of claim 20, wherein the supporting member comprises:

a first supporting member including a first hole and supporting the vibration apparatus; and a second supporting member at a rear surface of the first supporting member, the second supporting member including a second hole overlapping the first hole.

22. The apparatus of claim 21, wherein a frame of the vibration apparatus has a size being greater than a size of the first hole and being smaller than a size of the second hole, and the frame of the vibration apparatus is inserted into the second hole.

23. The apparatus of claim 21, wherein the vibration apparatus further comprises one or more holes configured at the frame to overlap one or more of the first coil and the second coil.

24. The apparatus of claim 23, wherein the vibration apparatus further comprises a filter member configured at a rear surface of the frame to cover the one or more holes of the vibration apparatus.

25. The apparatus of claim 23, further comprising one or more pads provided between the supporting member and the rear surface of the vibration member in a peripheral region of the vibration apparatus.

26. The apparatus of claim 25, further comprising a partition disposed between the rear surface of the vibration member and the supporting member to surround the vibration apparatus, wherein the one or more pads comprise a material which is more ductile than a material of the partition.

27. The apparatus of claim 26, further comprising an enclosure disposed at a rear surface of the supporting member to cover the rear surface of the vibration apparatus.

28. The apparatus of claim 27, further comprising:

a vibration space disposed at a periphery of the vibration apparatus by the partition, the vibration member, and the supporting member; and a seal space disposed at the rear surface of the vibration apparatus by the enclosure, wherein the vibration space and the seal space are communicated through the one or more holes of the vibration apparatus.

29. The apparatus of claim 28, wherein the vibration space and the seal space have an air atmosphere or a gas atmosphere.

30. The apparatus of claim 28, further comprising an inert gas filled into the vibration space and the seal space.

31. The apparatus of claim 27, wherein the enclosure includes a soft rubber material or a soft silicon material.

32. The apparatus of claim 27, wherein the enclosure includes a metal material or a nonmetal material.

33. The apparatus of claim 32, further comprising a porous member spaced apart from the vibration apparatus and disposed at the enclosure to face the vibration apparatus.

34. The apparatus of claim 20, wherein the vibration member is implemented in at least one among: a display panel configured to display an image, a screen panel on which an image is to be projected from a display apparatus, a light emitting diode lighting panel, a signage panel, a vehicular interior material, a vehicular exterior material, a vehicular glass window, a vehicular seat interior material, a building ceiling material, a building interior material, a building glass window, an aircraft interior material, an aircraft glass window, and a mirror.

35. The apparatus of claim 20, wherein the vibration member comprises one or more materials among plastic, fiber, leather, wood, cloth, rubber, carbon, glass, and paper.

* * * * *